(12) United States Patent
Koskay et al.

(10) Patent No.: US 9,704,129 B2
(45) Date of Patent: Jul. 11, 2017

(54) METHOD AND SYSTEM FOR INTEGRATED PROFESSIONAL CONTINUING EDUCATION RELATED SERVICES

(75) Inventors: Kenneth Koskay, Southlake, TX (US); Stephen Perreault, New York, NY (US); Stephanie Jeanne Black, Grapevine, TX (US); Todd Denlinger, Leander, TX (US); Greg Poirier, Pinckney, MI (US)

(73) Assignee: Thomson Reuters Global Resources, Baar (CH)

( * ) Notice: Subject to any disclaimer, the term of this patent is extended or adjusted under 35 U.S.C. 154(b) by 1042 days.

(21) Appl. No.: 12/584,130

(22) Filed: Aug. 31, 2009

(65) Prior Publication Data
US 2011/0055035 A1    Mar. 3, 2011

(51) Int. Cl.
G06Q 30/00 (2012.01)
G06Q 10/10 (2012.01)
G06Q 20/10 (2012.01)
G06Q 30/06 (2012.01)
G06Q 50/20 (2012.01)

(52) U.S. Cl.
CPC ........... *G06Q 10/10* (2013.01); *G06Q 20/102* (2013.01); *G06Q 30/018* (2013.01); *G06Q 30/0601* (2013.01); *G06Q 50/205* (2013.01); *G06Q 50/2053* (2013.01); *G06Q 50/2057* (2013.01)

(58) Field of Classification Search
CPC ...................................................... G06Q 30/00
USPC .................................................... 705/26, 27
See application file for complete search history.

(56) References Cited

U.S. PATENT DOCUMENTS

| 6,368,110 B1 * | 4/2002 | Koenecke et al. ............ 434/219 |
| 7,085,800 B2 * | 8/2006 | Abbott et al. ................ 709/200 |
| 8,401,871 B2 * | 3/2013 | Fotsch .................. G06F 19/327 |
| | | 705/2 |
| 2001/0032094 A1 | 10/2001 | Ghosh et al. |

(Continued)

OTHER PUBLICATIONS

IThomson Tax & Accounting: "CPE & Training Solutions from Thomson Tax & Accounting," Internet Archive Wayback Machine, www.archive.org; http://trainingcpe.thomson.com; May, Jul. 2008; 10pgs.*

(Continued)

*Primary Examiner* — Rob Pond
(74) *Attorney, Agent, or Firm* — Duncan Galloway Egan Greenwald, PLLC; Kevin T. Duncan

(57) ABSTRACT

The present invention provides a computer-implemented integrated professional services research, resource, and education delivery and management system. The invention integrates the professional services delivery aspect with the professional education, training and requirements aspect associated with professional services firms and concerns. The invention provides electronic filing and reporting of requirements related documents to maintain state certifications. By providing a more efficient learning environment that is more fully integrated in the practice of a given profession, the present invention promotes an environment that more quickly advances and cultivates the skills of professionals, especially those with little experience, and more closely relates such development with the particular areas in which the individual is engaged in the practice and delivery of professional services, thereby enhancing value delivered to the client.

87 Claims, 35 Drawing Sheets

(56) References Cited

U.S. PATENT DOCUMENTS

| | | | |
|---|---|---|---|
| 2002/0169771 A1* | 11/2002 | Melmon et al. | 707/5 |
| 2004/0078211 A1 | 4/2004 | Schramm-Apple et al. | |
| 2004/0115596 A1 | 6/2004 | Snyder et al. | |
| 2005/0060221 A1* | 3/2005 | Kolar et al. | 705/10 |
| 2006/0122900 A1* | 6/2006 | Bean et al. | 705/26 |
| 2006/0168233 A1* | 7/2006 | Alcorn et al. | 709/226 |
| 2007/0088563 A1 | 4/2007 | Nardotti et al. | |
| 2008/0318197 A1* | 12/2008 | Dion | 434/322 |
| 2009/0276243 A1* | 11/2009 | Fotsch | G06F 19/327 705/2 |

OTHER PUBLICATIONS

International Search Report, PCT/US2010/002413, Feb. 16, 2011.

* cited by examiner

CPE & Training Solutions from Thomson Tax & Accounting    Training | Support | Contact Us | My ACCOUNT

Welcome, Roy M. Martin, Jr.

| My CPE | My Bookshelf | My Favorite Experts | Web Chat | Other Solutions |

A default learning path has been designed for you based on your user preferences and any other requirements specified by your company. You can build and save additional learning paths to help you determine different career paths or other goals you are interested in.

Default Learning Path Criteria:
KPMG Required: Professional Conduct                    Area of Practice: Accounting
Area of Practice: Accounting                           # of years of experience: Over 10
Training must interested in: Accounting                Other Designations: CFP
Preferred Media: Webinars, Print-Based
Practice Specialties: Accountant, Individual Tax, Ethics, Management
States requested: Alabama, California Saved Learning Paths                    Default Learning Paths
10/21/2006  Becoming a Tax Specialist   (based on your user profile)
11/15/2006  My path to Supervisor       Build New Learning Path
12/20/2006  Building up to Manager

FIGURE 12

CPE & Training Solutions from Thomson Tax & Accounting    Training | Support | Contact Us | My ACCOUNT

Welcome, Roy M. Martin, Jr.

My CPE | My Bookshelf | My Favorite Experts | Web Chat | Other Solutions

View Learning Path Criteria   Change Learning Path Criteria
   1302            1304

Most Immediate Goal    Learning Path - complete within 1 year
Become Supervisor ▼    Other Goals:  1308
   1306              Executive Presence ▼    [Save]

1300

1310

| Date | Brand | Course ID | Course Title | Level | Deliver Format | Credit Hours |
|---|---|---|---|---|---|---|
| n/a | RIA | n/a | Judicial Concepts of Taxation | Basic - Tax | Self-Study - Online | 1 hour |
| n/a | RIA | n/a | Getting Started with Checkpoint | Basic - Tax | Self-Study - Online | 2 hours |
| 5/6/2017 | PPC | STF | Staff Training 3 – Developing Supervisors and Managers | Basic - Tax | Instructor-Led | 16 hours |
| n/a | RIA | n/a | Income Tax Training 1040 Module 1 | Basic - Tax | Self-Study - Online | 9 hours |
| n/a | (logo) | 0ASPPECF | Ethics and Professional Conduct for CFP's | Basic - Ethics | Self-Study - Online | 2 hours |

FIGURE 13

CPE & Training Solutions from Thomson Tax & Accounting     Training | Support | Contact Us | My ACCOUNT

Welcome, Roy M. Martin, Jr.

My CPE | My Bookshelf | My Favorite Experts | Web Chat | Other Solutions    1400

Learning Path – complete within 1 year    View Learning Path Criteria | Change Learning Path Criteria

| Date Completed | Company | Course Title | Field of Study | Delivery Format | Credit Hours Earned | Status |
|---|---|---|---|---|---|---|
| n/a | | Judicial Concepts of Taxation | Tax | Self-Study - Online | 1 hour | Not Started |
| 10/31/2006 | RIA | Getting Started with Checkpoint | Tax | Self-Study - Online | 2 hours | Completed |
| n/a | PPC | Staff Training 3 – Dev Sun's and Mars | Professional Development | Instructor-Led | 16 hours | Not Started |
| 12/12/2006 | | Income Tax Training 1040 Module 1 | Tax | Self-Study - Online | 9 hours | Not Started |
| 12/13/2006 | | Ethics and Professional Conduct for CFP's | Ethics | Self-Study - Online | 2 hours | Completed |

You have completed 13% of your Learning Path Goal (4 of 30 hours)

CPE & Training Solutions from Thomson Tax & Accounting    Training | Support | Contact Us | My ACCOUNT RIA    [logo]    PPC    QuickFinder

COURSE LOADER

Welcome, Roy M. Martin, Jr.

Check all that apply  2202

☐ Load NASBA Compliant Questions
☐ Load Quizzers
☐ Load Practice Exam
☐ Extract Questions from Imported Content

Import Course Information

You may import any of these file types: PDF, DOC, XLS, XML

[Browse]

_____  2204

[Import]

To automatically generate questions from keywords found in the course materials, click Build Keyword Search.

[Build Keyword Search]

CPE & Training Solutions from Thomson Tax & Accounting    Training | Support | Contact Us | My ACCOUNT

RIA

2402 —▶
Welcome, Brian Hall

My CPE | My Bookshelf | My Favorite Experts | PPC QuickFinder | Web Chat | Other Solutions Learner Administration Search for other Learner's in your area of responsibility
-- Select Learners from List --  [Submit]
2408

| Learner Name | % Complete | Hours Completed | Hours In Progress | Hours Not Started |
|---|---|---|---|---|
| Roy M. Martin, Jr. | 13% | 4 | 10 | 16 |
| Mark Schlageter | 33% | 20 | 14 | 25 |
| Bill Smith | 7% | 4 | 9 | 40 |
| Jane Jones | 25% | 12 | 16 | 20 |

2404 — Click any Learner's name to see a detailed record of their Course progress
2406 — and their progress in meeting Certification requirements

THOMSON
TAX & ACCOUNTING

CPE & Training Solutions from Thomson Tax & Accounting    Training | Support | Contact Us | My ACCOUNT

Welcome, Roy M. Martin, Jr.

My CPE | My Bookshelf | My Favorite Experts | Web Chat | Other Solutions

My CPE Reporting

2004 CPE Hours — 2502

Total CPE Hours 40.00

| Print Course | | Description | Expires | Score | Hours | Attempts | Status |
|---|---|---|---|---|---|---|---|
| ☐ 02-000 | | Estates & Trusts (1 Day) | 7/25/2006 | 99% | 20.00 | 2 | Completed |
| ☐ 02-000 | | Federal Gift Tax | 5/20/2006 | 95% | 20.00 | 1 | Completed |

2005 CPE Hours — 2504

Total CPE Hours 40.00

| Print Course | | Description | Expires | Score | Hours | Attempts | Status |
|---|---|---|---|---|---|---|---|
| ☐ 02-000 | | Estates & Trusts (1 Day) | 7/25/2007 | 99% | 20.00 | 2 | Completed |
| ☐ 02-000 | NEW | Federal Gift Tax | 7/25/2007 | 90% | 10.00 | 1 | Completed |
| ☐ 02-017 | 20 | Generation Skipping Tax | 7/25/2007 | 79% | 3.00 | 2 | Completed |
| ☐ 02-030 | PPCU | New York State Ethics | 7/25/2007 | 99% | 7.00 | 3 | Completed |

2006 CPE Hours — 2506

Total CPE Hours 40.00

2508

*Congratulations, Roy, here are your rolling three years of completed CPE. You are now ready to file your License Renewal CPE Report with the New York State Board of Accountancy.*

[ Print Selected ]  [ Click here to print your CPE License Renewal Report ]

Results for: retirement    Documents: 9
$ = Less than $100   $$ = $100 - $199   $$$ = $200 and over   GU = Clear Up   MM = MicroMash

| Acronym | Product Name | Brand | Price | Print | Comp | ILT | Inhouse | Hours |
|---|---|---|---|---|---|---|---|---|
| Consulting | | | | | | | | |
| ElderCare | | | | | | | | |
| RDGG | Planning for Retirement to Transfers at Death | | | | | | | |
| 06-ACD11004 | Planning for Retirement Transfers at Death Audio CD Program with Manual and CPE | GU | $$ | X | ♦ | ♦ | | 8 |
| 06-A11004 | Planning for Retirement Transfers at Death Audio Tape Program with Manual and CPE | GU | $$ | X | ♦ | ♦ | | 9 |
| 06-ME12004 | Planning for Retirement Transfers at Death Manual and CPE Exam (must be ordered along with recorded program) | GU | $$ | X | | | | 9 |
| Taxation | | | | | | | | |
| Retirement Income Taxation | | | | | | | | |
| RETS | 2003-2004 Retirement Income Tax Update | MM | $ | | ♦ | | | 6 |
| IRAS | Individual Retirement Accounts (IRAs) | MM | $$ | | ♦ | | | 9 |
| RETI | Retirement Income Taxation | MM | $ | | ♦ | | | 6 |
| EXTA | Retirement Income Taxation - Advanced | MM | $ | | ♦ | | | 8 |

CHECKPOINT® LEARNING

Home | CPE Solutions | CPE Brands | Sales & Support | Course Finder | Online Grading | 🛒 Shopping Cart

Training/Solutions

Online Learning
Live Seminars & Conferences
In-House Training
Self Study Courses
Online Grading

Training & Brands

MicroMash
PASS Online
Reqwired
Webinar Learning Network
Gear Up
Bell Learning (Gear Up Workshops)
PPC
AuditWatch
Quickfinder
RIA

Add. Resources

Noted Experts
CPE Compliance
Recent CPE Rule changes
More...

Controller's and Practitioner's Business Tax Update

By Allan Boress, Arthur Berkowitz

Marketing Description: This course summarizes the major provisions of new tax legislation, cases, and regulations examining their impact on, businesses, investments, and retirement plans. The emphasis is on strategic tax planning for business entities and planning opportunities. This presentation is designed to meet those needs by identifying features of recent developments having special meaning to the tax practitioner and return preparer. Practical solutions to problems of the general practitioner and tax planning will be emphasized.

Illustration/Graphic:

Course ID: CLQABA

Category: Taxation

NASBA Field of Study:

NASBA Registry/QAS Credits:

CPE Credits: 13

NASBA Delivery Method:

Other Certifications: 3300

Level: Basic

Learning Objectives: Show

Outline: Show

Pre-requisites : General understanding of federal income taxation

Advanced Preparation: none

System Requirements: Controller's and Practitioner's Business Tax

Quick Search

Field of Study
Accounting and Auditing
Consulting
Information Technology
Management
Personal Development
Specialized Industries
Taxation
Yellow Book
Ethics

Delivery Format
In-House Training
Live Seminars and Conferences
Online Learning - Webinars
Online Learning – Self-Study
Self-Study – Print-based
Virtual Classroom (Webinars)

Thomson CPE Brands
Bell Learning
Gear Up
MicroMash
PASS Online
PPC
Quickfinder
RIA
Webinar Learning Network

Figure 33

METHOD AND SYSTEM FOR INTEGRATED PROFESSIONAL CONTINUING EDUCATION RELATED SERVICES

FIELD OF THE INVENTION

The present invention relates to the provision of professional services and to related education products, services and tools. More particularly, the invention relates to an integration of services and products related to developing, delivering, monitoring and reporting continuing education courses and materials. The present invention relates to computer-implemented tools, resources, and processes for presenting, transacting, delivering and reporting for credit professional services-related education in conjunction with providing professional resource and reference materials and tools.

BACKGROUND OF THE INVENTION

As partnerships, companies and commercial entities continue to strive for efficiency, consistency and flexibility, computers and software executed on computers are increasingly relied upon to automate, semi-automate, enhance, quicken and make reliable and uniform business processes. This is true even in fields of professional service providers, such as financial auditors, certified public accountants, lawyers, doctors, etc. In addition, with ever increasing bandwidth and data storage capabilities and compression techniques, large quantities of data, including audio and video streaming, may be effectively communicated over networks such as the Internet for a wide range of services and purposes.

The invention has application in areas of professional education and professional accreditation, such as the series of certified public accountant "CPA" exams required by individuals prior to receiving professional designations, e.g., CPA, as well as continuing education required to maintain such designations in various national, international and state jurisdictions. Professional education is also critical to professional firms for the development of its employees and for maintaining a pool of skilled individuals well adapted to meet the needs of clients in professional engagements, such as audits and preparing tax related filings.

In the various fields of professional services there exist computer/network-based professional research and resource systems that provide professionals with tools and resources to better deliver professional services to clients and within an organization. Such delivery of professional services may be from without an organization, such as by professional services firms, like law firms and accounting firms, or it may be from within an organization, such as an internal audit department. Companies, such as Thomson Reuters Corporation and all of its affiliated companies (collectively "Thomson Reuters®"), provide tools, resources and services to assist professionals, including lawyers, accountants and auditors in the practice of their respective profession. In the often overlapping areas of accounting, tax, financial reporting, internal compliance, and auditing, one such system is the CHECKPOINT® platform and in the area of legal services one such system is WESTLAW®, both offerings of Thomson Reuters.

CHECKPOINT is an online, browser-based, tax and accounting research service/platform used by professionals in providing tax and accounting related services to external clients or internally within organizations in the areas of internal auditing, planning, cost management, compliance, financial reporting, risk assessment and internal controls. CHECKPOINT may be used in conjunction with other products and services. CHECKPOINT research tools may be used with other software and tools and applied against guidance and content resources, such as the following software, tools, guidance and content: RIA®, PPC®, EBIA®, IBFD® and WG&L®, all offerings of Thomson Reuters. CHECKPOINT in conjunction with such tools and content may be employed to deliver, for example, guidance in areas of tax and accounting, employee benefits, etc., with delivery in the form of suggested auditing and other procedures, interactive checklists, links, e.g., hyperlinks, to content, questionnaires, uniform practice documentation, etc. CHECKPOINT provides professionals, such as accountants, financial managers, controllers, compliance officers and treasurers, with tax and accounting related content and resources including: expert editorial analysis from RIA, guidance from WG&L authors and PPC experts, and content from IBFD, EBIA and others sources. CHECKPOINT integrates content from RIA, WG&L, PPC, IBFD, EBIA and BNA® with primary sources from organizations including AICPA (American Institute of Certified Public Accountants), SEC (U.S. Securities and Exchange Commission), GAAP (Generally Accepted Accounting Principle/Procedure), FASB (Financial Accounting Standards Board), GASB (Governmental Accounting Standards Board), IASB (International Accounting Standards Board) and more. Users can search with customizable search options performed against customizable libraries and are presented with links to primary source materials and analysis, as well as workflow tools. CHECKPOINT delivers tax & accounting news to user inboxes and makes such information accessible online.

CHECKPOINT may also be used with tax, auditing, and compliance software, for instance Thomson Reuters' CS PROFESSIONAL SUITE® (including PRACTICE CS®, ENGAGEMENT CS®, ULTRATAX CS® and others), PPC's E-PRACTICE AIDS®, PPC's E-TOOLS®, PPC's SMART PRACTICE AIDS®, WG&L's E-TOOLS FOR INTERNAL AUDIT®, ONESOURCE®, GOSYSTEM®, GOTRACKER®, TAXSTREAM®, FAST-TAX®, E-FORM®, WORKPAPERS PLUS®, PPC'S ENGAGEMENT LETTER GENERATOR®, DISCLOSURE® and Interactive Disclosure Libraries. Using CHECKPOINT in conjunction with these related software, tools, and services enables users to more efficiently access and process large volumes of data, regulatory and other content and to deliver accounting, auditing, tax (federal, state and local, international), estate planning, payroll, compliance, internal controls, financial management, engagement management, and many other related services. Solutions such as PRACTICE CS. and ENGAGEMENT CS, provide users with dashboards or user interfaces to facilitate the management of a professional practice and firm as well as management of discrete engagements associated with such a practice. Such systems provide tools to manage time-keeping, engagement assignments and time-tables/progress, invoicing/billing, Related to the delivery of professional services, there exist products and services directed to providing professional development resources, such as training, continuing professional education ("CPE" or "cpe"), professional accreditation reporting and tracking. Such products and services include, for example, REQWIRED®, MICROMASH®, Course Finder, Online Grading Center, PASSONLINE®, PPC, RIA, GEARUP®, Bell Learning, QUICKFINDER®, CPEFINDER®, Webinar Learning Network, and AUDITWATCH®. These services may be described as learning management tools that provide continuing education and training course, content, tracking, reporting and related functionality. Education and training content can be in print or electronic form or a combination and may be delivered in a variety of forms, including in-house seminars, live seminars, audio/video taped and streamed seminars and conferences, live seminars and conferences, self-study, e-learning self-study, and instructor-led learning. MICROMASH and PASSONLINE provide computer-based training, online learning, and continuing professional education content and services to financial professionals, CPA firms, global corporations, government agencies, associations, higher education institutions, and individual learners. Courses may be available online, via download, and CD format. GEARUP, Bell Learning, PPC, and AUDITWATCH offer live seminars and conferences, in-house training, self-study courses. Course Finder is an interactive, online search engine for CPE and training solutions. REQWIRED, a learning management solution (LMS) and CPE tracking solution directed to accounting and financial professionals offered by Thomson Reuters, provides learning libraries and tools for professionals to learn in an "on-demand" fashion to meet learning and development needs set by the practice group and the professional services firm or organization. REQWIRED provides computer-based "e-learning' training, pointing to overall "significant" increases in retention and transfer of learning, and heightened ability to apply skills on the job. Although cost-savings, convenience, tracking and monitoring are advantages associated with e-learning systems, these systems make up a fragmented market what is needed is a system that can integrate the various education and reporting related needs.

Most professionals are subject to mandatory continuing education requirements critical to licensing and practice in the associated area or profession. One problem associated with managing CPE requirements is that each state in the United States maintains a unique set of ever-changing rules and requirements. Keeping abreast of the various and changing requirements, and their applicability to each professional's unique situation, is a daunting and time-consuming task. REQWIRED's computer-based system includes some capabilities in the areas of continuing education tracking, CPE compliance management, rule change monitoring, and tracking of CPE requirements, e.g., for accounting professionals, lawyers, doctors and other professionals. REQWIRED includes capabilities in the areas of establishing and managing internal training.

The disjointed products and services discussed above and those known fail to provide professional organizations a comprehensive platform for integrating professional engagement, professional resources, engagement and staff management, professional and staff training, education and reporting, and related services associated with delivery of professional services. What is needed is a comprehensive and/or integrated platform that accomplishes the primary and associated needs for professional services organizations in an efficient and effective manner.

SUMMARY OF THE INVENTION

We've recognized the needs of the market and the present invention provides an integrated professional services research, resource, and education delivery and management system that meets the needs presently felt and that solves many of the existing shortcomings associated with fragmented platforms. The invention integrates the professional services delivery aspect with the professional education, training and requirements aspect associated with professional services firms and concerns. By providing a more efficient learning environment that is more fully integrated in the practice of a given profession, the present invention promotes an environment that more quickly advances and cultivates the skills of professionals, especially those with little experience, and more closely relates such development with the particular areas in which the individual is engaged in the practice and delivery of professional services, thereby enhancing value delivered to the client.

Advantageously, the present invention provides within the framework of a professional services system a CPE system that automatically reports completion of qualified CPE courses and logs and tracks credits assigned to individual users for tracking and reporting on CPE fulfillment and learning path progress. In meeting industry needs, the invention provides a professional services research resources system that automatically accesses CPE related databases and services through resource content and materials presented to users using the system. In meeting industry needs, the invention provides a system that automatically determines availability of CPE related content and services based on an existing contract and that presents users with options of purchasing or otherwise accessing CPE content and services not included in the existing contract and in presenting offers.

In one respect, the invention provides a professional services tool that includes an application that performs a variety of functions such as CPE and training planning, course delivery, progress tracking, course completion and reporting, and licensure renewal. The invention may use workflows around these stages to more effectively implement a firm-wide education and professional development program. The system facilitates delivery of education courses via a variety of media to promote a blended learning experience, including electronic online and download, webinars, podcasts, instructor led training (ILT), in-house training (IHT), print media, self-study, CD/DVD. The inventive system also allows for greater ways to implement administrator oversight and supervision in the learning and licensure process. Administrators can use the system to plan an individual's learning path and track progress toward that goal.

By providing contextual CPE, the invention drives awareness of non-education, professional resource products and helps deliver value-added to users. Users can use the bi-directional, contextual association by subject matter across resource delivery systems and education delivery systems to more efficiently utilize the whole array of professional vendor services.

In one embodiment the present invention provides a computer-implemented method comprising: receiving by a computer a request to register for a CPE course, the request being in the form of an electronic signal; associating with a database record a set of information relating to a jurisdiction in which CPE credit is associated with the CPE course; subsequent to receiving the request, providing the CPE course; identifying when the CPE course has been successfully completed; and upon completion of the CPE course, storing at a database a set of data related to completion of the CPE course and associating the completion with an individual, and electronically notifying the jurisdiction of the completion to facilitate an award of CPE credit to the individual.

In another embodiment the invention provides a computer-based system for providing CPE course-related services and content over a network, the system comprising a central server, a database and a plurality of individual user accounts, the system further comprising: code executable by a central server to generate a user interface screen for remote display, the user interface screen adapted to present CPE course information and to facilitate receiving by the central server a request to register for a CPE course, the request being in the form of an electronic signal and associated with an individual user account; a record stored in the database and comprising a set of information relating to a jurisdiction in which CPE credit is associated with the CPE course; code executable by the central server to facilitate registration for and delivery of the CPE course; code executable by the central server to facilitate confirmation of the completion of the CPE course; and code executable by the central server to store at a database a set of data related to completion of the CPE course, associating the set of data with the individual user account and electronically notifying the jurisdiction to facilitate an award of CPE credit for an individual associated with the individual user account.

In yet another embodiment, the invention provides in a computer-based system for providing CPE course-related services and content over a network, a computer-readable medium having embodied therein a computer program for execution on a computer having an associated memory. The computer readable medium comprises: a graphical user interface adapted to present for remote display user interface screens associated with CPE course-related services; code executable by a central server to generate a user interface screen for remote display, the user interface screen adapted to present CPE course information and to facilitate receiving by the central server a request to register for a CPE course, the request being in the form of an electronic signal and associated with an individual user account, the central server adapted to access for processing a record stored in a database, the record comprising a set of information relating to a jurisdiction in which CPE credit is associated with the CPE course; code executable by the central server to facilitate registration for and delivery of the CPE course; code executable by the central server to facilitate confirmation of the completion of the CPE course; code executable by the central server to store at the database a set of data related to completion of the CPE course and to associate the set of data with the individual user account; and code executable by the central server to electronically notify the jurisdiction to facilitate an award of CPE credit for an individual associated with the individual user account.

And in yet another embodiment, the invention provides a computer-based system for providing professional resource and learning services over a network, the system comprising: a first server executing code adapted to generate for remote display a first user interface screen comprising professional resource-related content and a link to access CPE course information related to a CPE course including a set of content related to the professional resource-related content presented via the first user interface screen; a second server executing code adapted to generate for remote display a second user interface screen comprising information related to the CPE course; the second server adapted to receive over a communications link an electronic signal representing a request to register for the CPE course, and further adapted to associate with a database record a set of information relating to a jurisdiction in which CPE credit is associated with the CPE course; the second server adapted to identify when the CPE course has been successfully completed and to store at a database a set of data related to completion of the CPE course, including data associating the completion with an individual; and the second server adapted to establish a communication link to electronically notify the jurisdiction of the completion to facilitate an award of CPE credit to the individual.

The system may be configured and the method may be performed in a variety and combination of environments and architectures, including Internet/WWW-based applications, desktop applications, and WWW-enabled applications.

The present invention builds on existing practice aids to provide a professional services research and work environment integrated with professional education and training environment, especially in the areas of tax, financial auditing and reporting, planning and risk assessment. To a large extent the present invention may be used to automate the continuing education course and material delivery, tracking, reporting and management functions associated with a professional services firm. These and other objects and benefits of the present invention are made more apparent with the aid of the following description and figures.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 8 depicts a user interface associated with the user account creation process;

FIG. 9 depicts a user interface associated with the user account creation process;

FIG. 11 depicts a user interface associated with the user profile;

FIG. 12 depicts a learning path user interface associated with the user profile;

FIGS. 13 depicts a learning path user interface associated with the user profile;

FIG. 14 depicts a learning path user interface associated with the user profile;

FIG. 16 depicts a screenshot representing a detailed Outlook appointment associated with the course entry of FIG. 15;

FIG. 18 depicts a user interface associated with a course progress function of the dashboard of FIG. 10;

FIG. 19 depicts a user interface associated with a course progress function of the dashboard of FIG. 10;

FIG. 22 depicts a user interface associated with a course loader function of the dashboard of FIG. 10;

FIG. 23 depicts a user interface associated with a course publisher function of the dashboard of FIG. 10;

FIG. 24 depicts a user interface associated with a supervisor student progress function of the dashboard of FIG. 10;

FIG. 25 depicts a user interface associated with a CPE reporting function of the dashboard of FIG. 10;

FIG. 26 depicts a user interface associated with a CPE course finder or search function of the dashboard of FIG. 10;

FIG. 27 depicts a user interface associated with a My Bookshelf function of the dashboard of FIG. 10;

FIG. 31 depicts a research user interface presenting search results associated with the user interface of FIG. 30 with education-related links;

FIG. 33 depicts an exemplary course offering screen displayed following a selection of a link from the user interface screen of FIG. 32;

DETAILED DESCRIPTION OF THE PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The invention provides an integrated professional services research, resource, and education delivery and management system. The invention provides a common entry point for education and training products and services and integrates professional resource and practice management systems with professional education, training, requirements and reporting systems. Through integration, the invention provides a more efficient and effective learning environment fully integrated in the practice of a given profession. The invention provides an integrated system that promotes a learning environment that more quickly advances and cultivates the skills of professionals and more closely relates and monitors such development with engagements, practice areas and specialties, and licensure jurisdictions associated with individuals.

Figure 1:
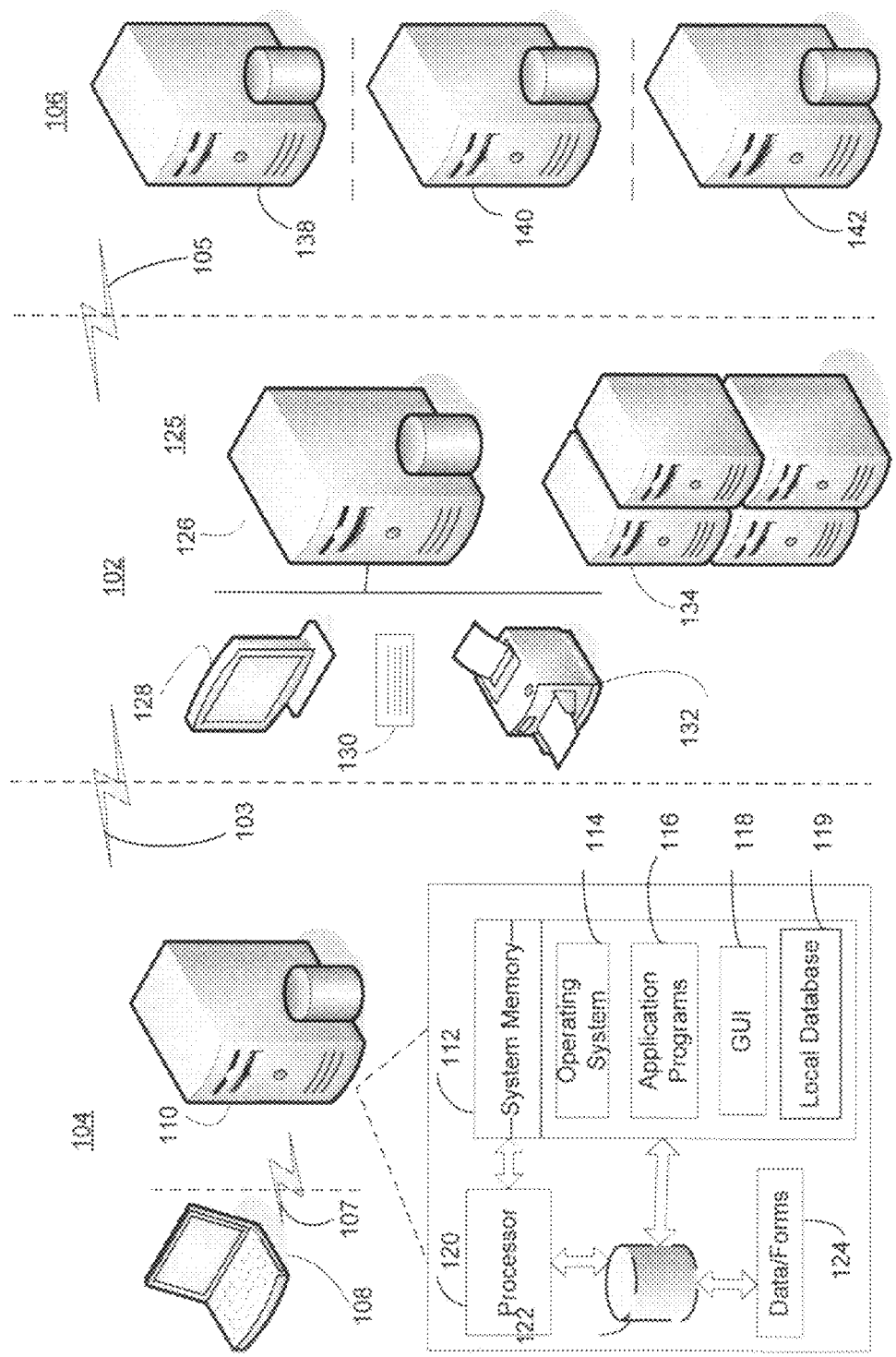
FIG. 1 is a schematic diagram of a first exemplary system embodiment of the present invention.

Referring now to FIG. 1, a professional resource system (PRS) is shown for providing a practice management system coupled with an education and learning platform for use in cultivating and maintaining skills and credentials of a group of professionals involved in the delivery of professional services, e.g., an accounting or law firm. The PRS comprises a network-based professional education aspect 102, a practice management system (PMS) 104 and remote jurisdiction-based professional license and credential aspect 106. In one exemplary embodiment, the professional services practice management facility 104 executes a practice management software application that may be specifically directed to use in a particular industry or profession, e.g., accounting and auditing. An example of a commercially available practice management software solution is the Thomson Reuters CS PROFESSIONAL SUITE, including PRACTICE CS, ULTRATAX CS and other software applications.

In this example, authorized users 108, such as a financial professional conducting an audit, preparing a tax return, etc., may use a mobile or local device, such as a wireless-enabled notebook computer or network-connected desktop computer or other suitable machine to connect to the practice management system 104 via communication link 107, such as the Internet, Ethernet, WLAN, WAN or other suitable network. PMS 104 provides, for example, a web-based, GUI-driven user interface for presenting professional services practice management data and processes. PMS 104 may be part of a professional services firm or corporate-based network having PMS software executing on a firm/company-based system. In the alternative, PMS may be a web-based system to which a company or firm has a license and to which its employees may connect for content delivery and other services. User system 108 may connect directly with education aspect 102 and/or the licensing/credential aspect 106 or may access such services via the PMS 104. PMS 104 may access education services aspect 102 and/or licensing/credential aspect 106 via communication links 103 and 105. This configuration is one of many and is not limiting as to the invention.

For example, in one alternative configuration user system 108, which may comprise a central server connected to a network of computers, may include the PMS independent of a web-based service. In this example computer 110 executes the PMS software and processes practice related data and may utilize a local database 119, such as SQL 2005 or above or SQL Express or other suitable database. Communication links may be a combination of wireless, LAN, WLAN, ISDN, X.25, DSL, and ATM type networks, for example. The central PMS computer 110 may comprise a typical combination of hardware and software including system memory 112, operating system 114, application programs 116, graphical user interface (GUI) 118, processor 120, and storage 122 which may contain electronic information 124 such as forms, practice aids, titles, data, procedures and the like. The operating system 114 shall be suitable for use with the practice management functionality described herein, for example, Microsoft Windows Vista (business, enterprise and ultimate editions), Windows 2000 with SP4 or Windows XP Professional with SP2. Also, the PMS software may be browser-based and/or may include custom integration with Microsoft Office applications, e.g., Outlook, Word and Excel. Application programs 116 may include, for example, Microsoft Office 2007, Office XP with SP2, or Office 2003 with SP1 applications as well as professional services related software described above. The software and related tools, procedures, forms and data used to implement the PMS 104 processes may be accessed by the machine 110 via the Internet or it may be loaded onto the machine via CD-ROM or other media or a combination of such means.

For purposes of discussion, education aspect 102 may comprise a primary education services access system 125, comprising a central server and database 126, user interface peripherals such as drives (not shown), monitor 128, keyboard 130, and printer 132, and one or more additional education services systems 134. The central server and database 126 may be used to communicate remotely, or locally for that matter, directly with PMS 104 or with the user system 108 and may load, pass, receive information and instructions, such as software executable on the machine 110, or the machine 108, and data, forms, titles, guides, procedures and the like for storing and using locally by PMS 104 and/or user system 108. The primary education services access system 125 may be a web-based service primarily directed to delivering continuing professional education content and services or may be an overarching professional resource system, such as Thomson Reuters' CHECKPOINT system, which may have an education-focused component, e.g., CHECKPOINT Learning. In either scenario, system 125 includes an education resource interface, such as a web-page, directed to presenting users who are authorized to access the system with information, links, etc., concerning professional education and training.

Examples of additional education services systems 134 are REQWIRED, MICROMASH, Course Finder, Online Grading Center, PASSONLINE, PPC, RIA, GEARUP, Bell Learning, QUICKFINDER, Webinar Learning Network, and AUDITWATCH. Preferably one or more of the combination of PMS 104, primary education services access system 125, and additional education services systems 134 are configured to accommodate single-sign-on (SSO) to facilitate user recognition and access across the various education and practice management components. For instance, using SSO, a user at system 108 may log onto and access, either directly or through PMS 104, primary education services system 125 by entering an authorized account login profile either recognized by application software running at computer 110 or at system 125. Preferably, the system 125 includes a user authentication system (UAS) that processes user login credentials and enables access to recognized, authorized user accounts presented from system 108. The UAS, described further herein below, preferably uses a single-sign-on or similar process to coordinate authorization and access across the additional education services systems 134, which may be done using database structures and associations.

The remote jurisdiction-based professional license and credential aspect 106 is illustrated for exemplary purposes only as including separate server/database systems 138, 140 and 142. Each system represents a separate jurisdiction-based professional license/credential entity, or collection of entities, accessible via a communication link. Exemplary entities include, federal, state, local, international professional licensing authorities, for instance state bar organizations, certified public accounting organizations, board of accountancy jurisdictions, as well as licensing authorities for Certified Financial Planner, Certified Financial Advisor, Chartered Alternative Investment Analyst, Chartered Life Underwriter, Chartered Financial Consultant, Chartered Advisor for Senior Living, Chartered Property Casualty Underwriter, Financial Risk Manager. In addition, professional organizations such as societies may be included, for instance the American Bar Association (ABA), American Institute of CPAs (AICPA), and state bar and CPA societies. In this manner the primary education services access system 125 can interact with web-based systems of professional organizations via communication link 105. In addition, once the system 125 has facilitated access, a user via PMS computer 110 or directly may connect to the remote jurisdiction systems 138-142 to facilitate reporting of continuing education course completion and credit confirmation. This framework also may be used to facilitate membership benefits and interaction of users with professional organizations. In this manner, the systems 102, 104 and 106 may be configured according to the invention to establish an integrated professional services resource, practice management and professional education system. All or part of the necessary connections between systems 102, 104, and 106 may be Internet or (World Wide) WEB-based, Ethernet, wireless network, optical network or a combination and may be comprised of desktop-based, central server-based, or WEB-enabled or a combination.

Figure 2:
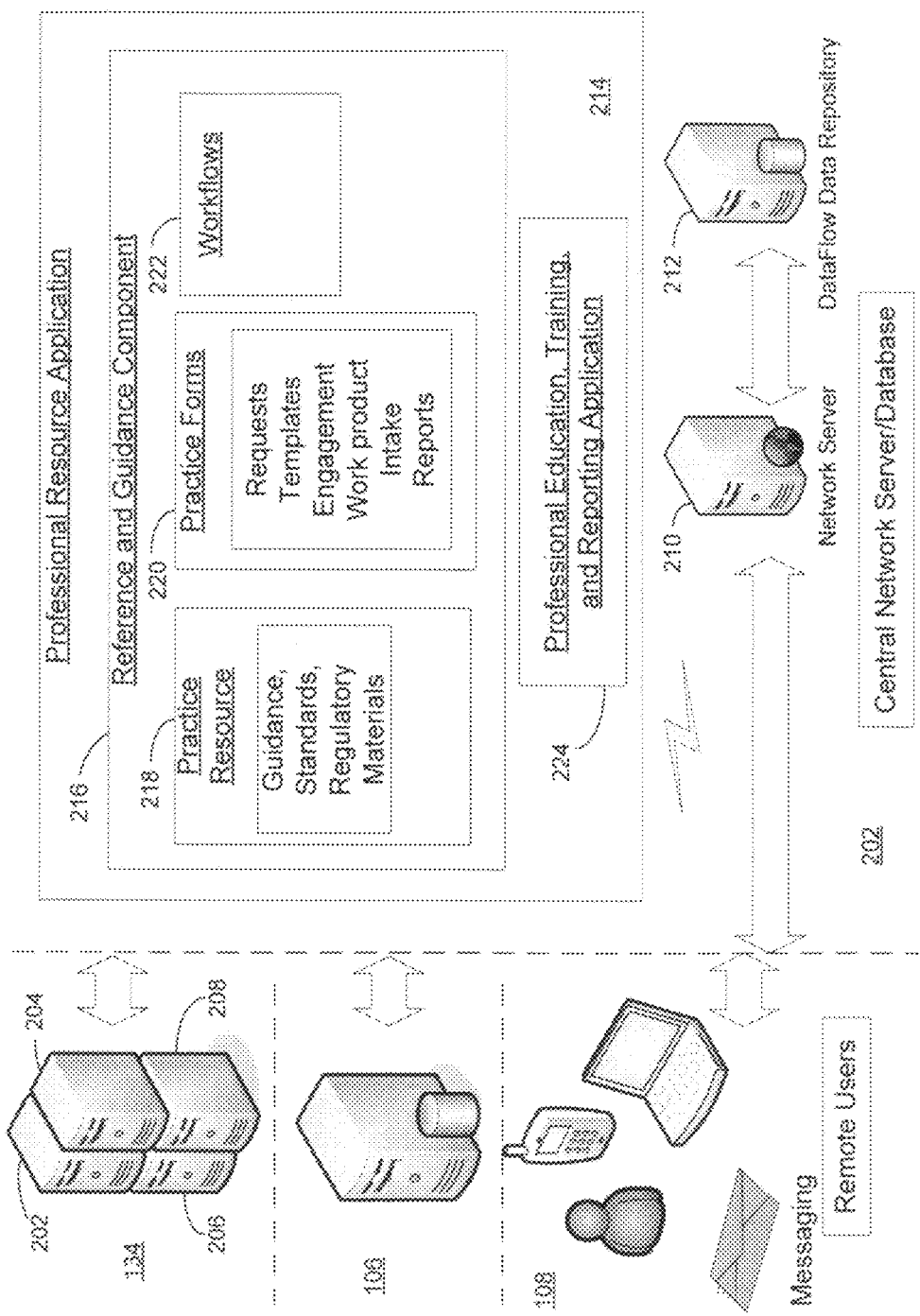
FIG. 2 is a schematic diagram of a second exemplary system embodiment of the present invention.

Referring now to FIG. 2, a Professional Resource System 202, for example Thomson Reuters' CHECKPOINT and related services, comprises a Professional Resource Software 214 operating on a Network Server 210 and operating in conjunction with a data repository 212, such as a relational database. Professional Resource Software 214 includes Reference and Guidance Component 216, which includes Practice Resource module 218, Practice Forms module 220, and Workflow module 222. Practice resource module 218 is adapted to present to authorized users guidance, standards, regulatory and other materials and information to assist in the rendering of professional services. Practice Forms module 220 is adapted to provide authorized users with various practice related forms and related information used in rendering professional services, including requests, templates, engagement, work product, intake and reports. Workflow module 222 may be used to generate, implement and track work-related processes. Education and training processes may be the primary concern of workflows or aspects, reminders, etc., of such processes may be included in workflows generated by use of module 222. In addition, the Professional Resource software also includes a professional learning (education, training, and reporting) software component 224, which, for instance, when accessed by an authorized user, such as user system 108, presents a personalized learning web-page or portal directed to presenting a user interface or dashboard directed to the individual associated with the user account logged on. User 108, including via PMS 104, may also connect to and interact with additional education services systems 134 and remote jurisdiction-based professional license and credentials systems 106 through access granted, such as by SSO or the like techniques, Professional Resource System 202.

Figure 3:
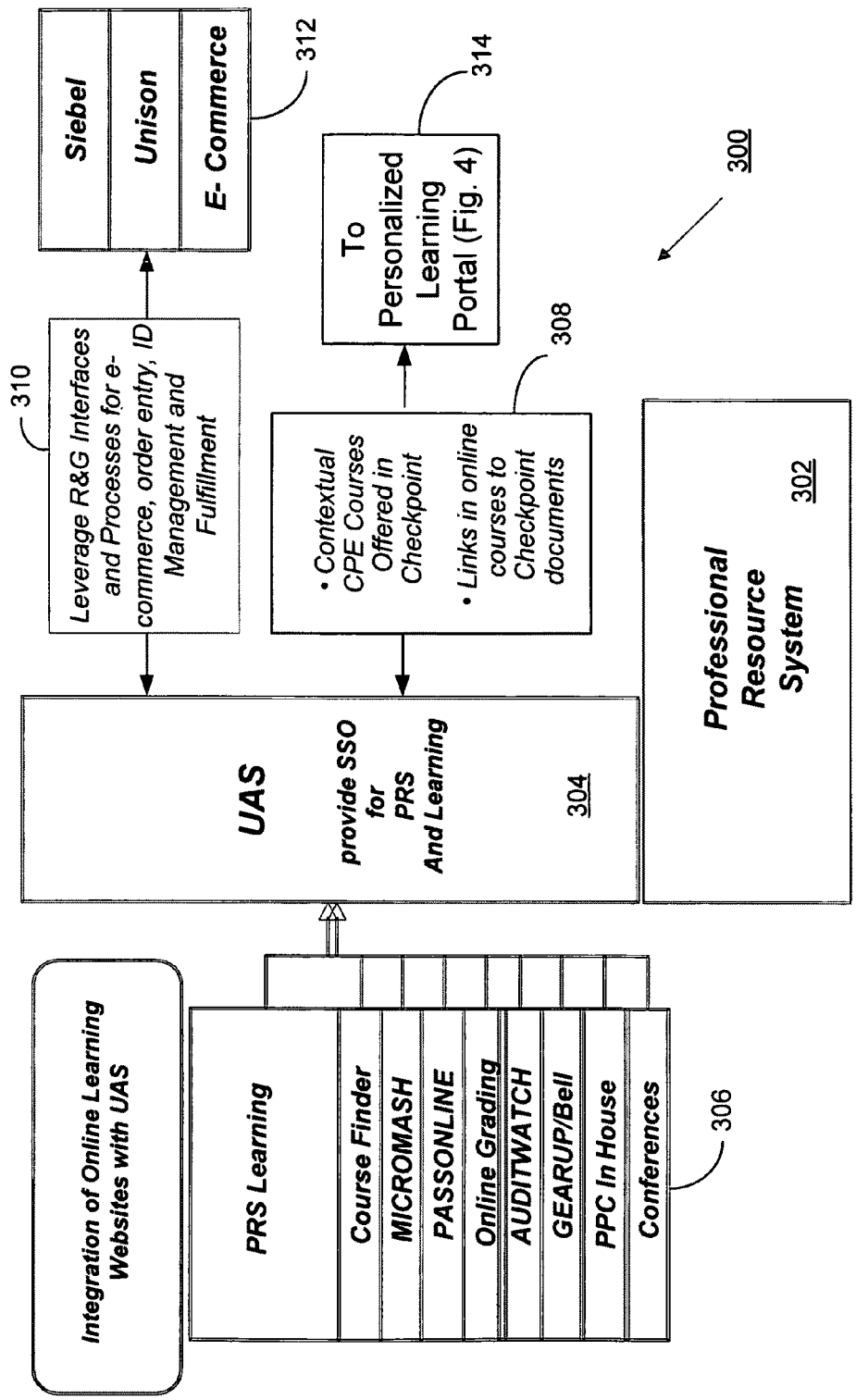
FIG. 3 is a schematic diagram of a user authentication system integration of learning system resources with a professional services research platform exemplary functionality for use in conjunction with the present invention.

FIG. 3 is a schematic diagram showing a Practice Management and Learning System 300 having a Professional Resource System 302 and related database(s), e.g., CHECKPOINT, operating in conjunction with a user authentication system (UAS) 304 adapted to process user login credentials and enables access to recognized, authorized user accounts presented from, for example, user system 108. The UAS 304 is used to manage IDs and preferably uses a single-sign-on or similar process to coordinate authorization and access across the additional education services systems 306, which may be done using database structures and associations. UAS 304 may include a pre-validation process to determine the specifics of a particular user's or student's system subscription. Tagging, as discussed herein below, and the presentment of links within content of either the Professional Resource System 302 or a learning system may be suppressed or determined, i.e., some, none or all links displayed, based on a user's subscription. Messages, such as "You must be a Professional Resource System subscriber— would you like information about subscribing to the service?" with options such as "No thanks" or "View information," may be displayed upon selection of a link to a course or content that is not available to that particular user.

The system can in effect assign a lifetime user account/ profile unique to that individual and the individual's learning history stays with that person for life. Contextual CPE course offerings may be presented along with links and other information to users via personalized web-portal or learning homepage, discussed below in reference to FIG. 4. In addition, UAS 304 may include or interact with an interface component 310 to interface the Professional Resource System 302 with outside e-commerce, order entry, identification management and fulfillment resources 312, e.g., Siebel, Unison, and other offerings. For example, UAS 304 may connect with the order management component of Siebel CRM software (Oracle Corporation) to allow for assignment of IDs as part of an initial order. In this manner users authorized to access and use the Practice Resource System 302 may further access websites or pages available from other education resource sites via a personalized learning portal. In addition, Practice Management and Learning System 300 includes, for example through use of database structure techniques, a contextual CPE course and linking component 308, discussed further below, that is used in conjunction with delivery, tracking and reporting of learning content and events via Personalized Learning Portal 402. In this manner Practice Management and Learning System 300 provides a professional services practice management solution that is integrated with a professional learning system. For instance, using database structures content and tools associated with a professional services resource, such as content and tools delivered by CHECKPOINT, may be associated with learning content and course offerings of and links to education services systems. The integration of services is presented to an individual professional/learner by way of the Personalized Learning Portal 402 and associated user interfaces. Examples of this integration are discussed herein below.

In one exemplary operation, a student accesses learning courses and materials based on a subscription to the Professional Resource System 302 by a pre-validation process that is invoked at the time a Student launches a course which confirms his/her personal authorization in the Professional Resource System. Based on the student's personal authorizations in Professional Resource System 302, the pre-validation process then suppresses any/all links pointing to documents not available through the student's subscription. Once the student's subscription is validated, the student may navigate within Practice Resource System 302 to the extent their subscription permits as if they had logged directly into that system.

In an alternative scenario, when a Student is not a subscriber to Practice Resource System 302, a pre-validation process may be invoked at the time a Student launches a course which confirms the Student's lack of a subscription. In this event, the pre-validation process will cause all identified links to display. Each link will offer the user access to the Practice Resource System 302 subscription information, for example by presenting a window or dialog box to view information about becoming a subscriber.

Figure 4:
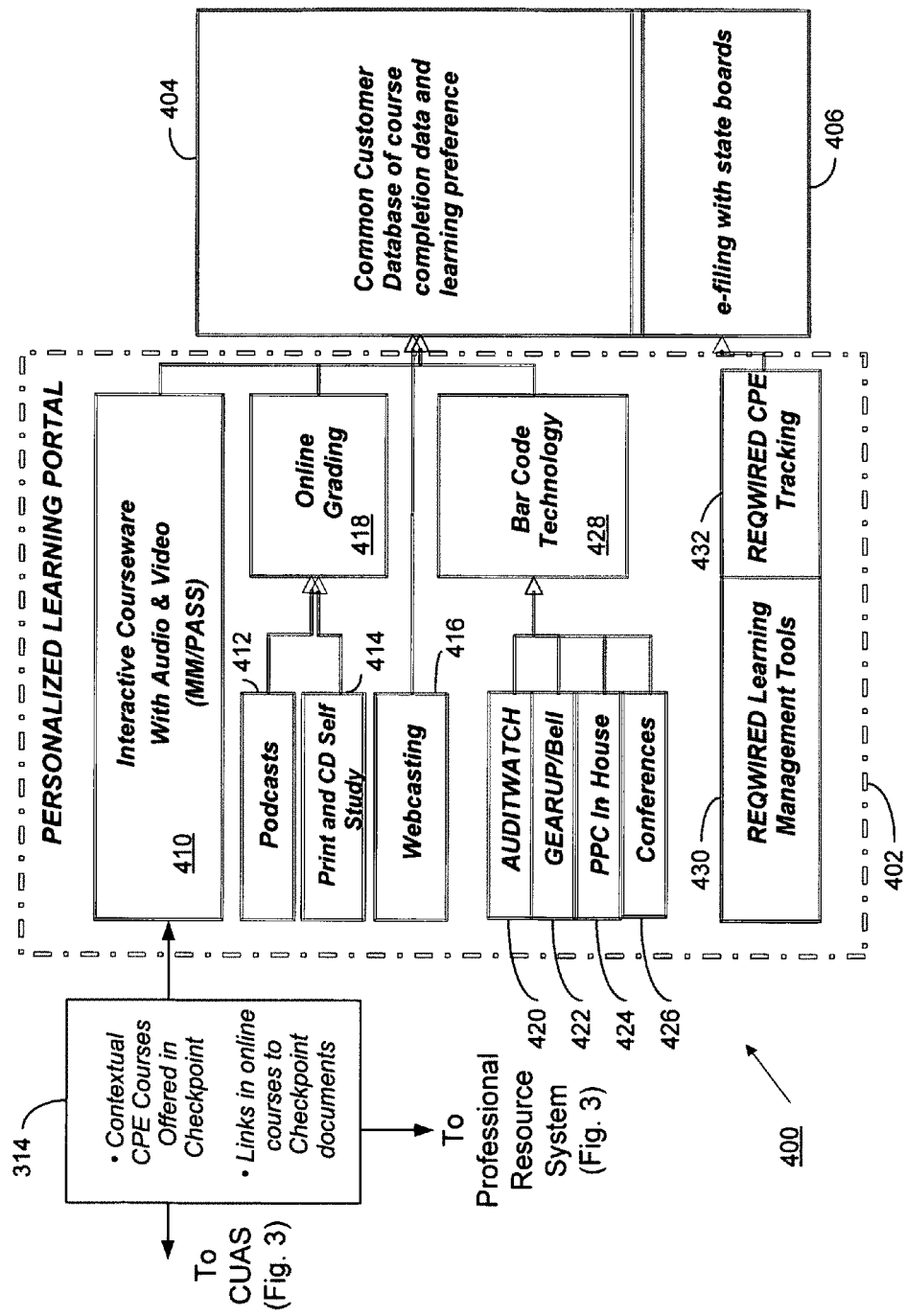
FIG. 4 is a schematic diagram of a personalized learning portal associated with the user authentication system of FIG. 3.

FIG. 4 is a schematic diagram illustrating a learning interface system 400 as a part of Practice Management and Learning System 300. The learning interface 400 comprises a personalized learning portal 402, which may be in the form of a homepage, window, dashboard, web portal, start page or the like. Portal 402 is preferably a browser-based user interface designed to organize and present links, data and information, RSS feeds, education service access points, etc., and is personalized based on specific user, firm or department related data and selections. In particular, and as discussed in regards to UAS 304 above, when a user, such as a user operating computer 108, has been granted access to multiple web-based services such as through an SSO process then the portal 402 can present a collective presentation and navigation access specific to that user. In this example, portal 402 includes an Interactive Courseware with audio and video component adapted to receive CPE courses, for example courses offered from MICROMASH and PASSONLINE. The Contextual CPE courses related via database structures or other suitable techniques may be selected for presenting to the individual learner by "clicking on" icons, links or other objects presented via user interface screens associated with the Practice Resource System 302 or for that matter the Practice Management System 104. Once selected, the Practice Management and Learning System 300 redirects or otherwise presents personalized learning portal 402 for viewing by the user. The association of learning tools and content with practice tools and content is "contextual" in that the learning and practice content are related, such as by having common subject matter in whole or in part. Examples are discussed herein below. A database structure is provided to handle associations of content with learning items, such as courses, and learning links.

Additional interface components may be included to provide individual learners with a variety of content delivery options, including podcasts 412, print and self-study 414, webcasting 416, Audit Watch 420, GEARUP/Bell 422, PPC In-house 424, and PPC Conferences 426. Online Grading 418 may be used in conjunction with the learning content delivery such as podcasts 412 and print and self-study 414. Online Grading 418 may be a stand-alone application that provides students the ability to take electronic tests for print-based self-study courses, including online exams related to a purchased product, such as a professional reference resource, that is separate from the purchase of the course itself, which may be given for free based on purchase or license of the product. Using Online Grading application 418 students may take a test online, receive their score and print their certificate during one or more login sessions.

Bar code technology may be used in conjunction with learning content delivery options such as Audit Watch 420, GEARUP/Bell 422, PPC In-house 424, and PPC Conferences 426. Portal 402 also includes Learning Management Tools and CPE tracking capabilities such as those offered by REQWIRED. Associated with presenting, delivering and completing education products and services, such as CPE courses, is reporting completion to appropriate authorities/ jurisdictions associated with the individual learner so that he/she may receive credits in order to obtain or maintain licensing requirements and credentials. The learning interface system 400 includes e-filing component 406 to facilitate reporting of completed, qualified CPE courses by the individual learner to appropriate jurisdictions, such as state CPA authorities, to obtain recognition and credits toward CPE requirements of each such authority. E-filing component 406 preferably includes a mechanism for receiving confirmation of the reporting and credits awarded to the individual. E-filing component 406 may confirm not only CPE credits associated with courses reported by learning interface system 400 but also other CPE credits awarded based on reporting handled in other fashion, such as by paper reporting. Learning interface system 400 also provides a course history and learning preference component 404 that tracks courses completed or in various stages of progress toward completion and that maintains a individual's profile of learning preferences, e.g., learning content delivery media preferences (in-house, in-person, self-study, e-learning, conference, instructor-led training (ILT), etc.). The personalized learning portal 402 provides information associated with the user such as in the form of a dashboard to reflect requirements, progress toward satisfaction of requirements, credit hours needed/remaining, status of courses under way, status of learning path personalized goals, etc. Portal 402 may be organized by a series of tabs to focus the interface based on efficiently grouped topics or functions and may include, for example, links to education services systems and links to professional boards/authorities/societies. This is discussed further herein below.

Figure 5:
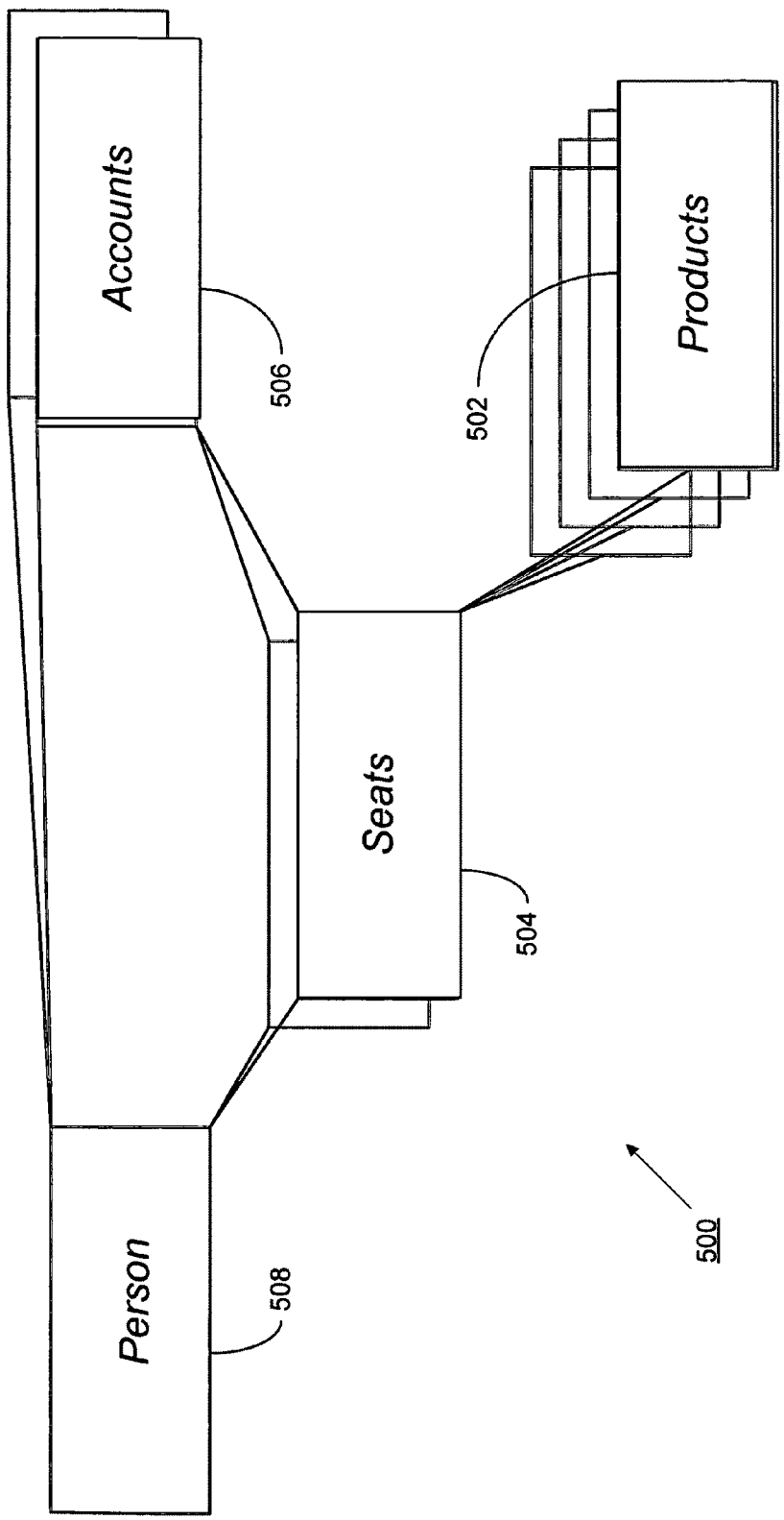
FIG. 5 is a schematic diagram of a database relationship structure for relating products, accounts, seats and persons.

FIG. 5 is a schematic of the database relationship structure 500 concerning relating, via a database, education and training related products 502 with "seats" 504 and user accounts 506 and ultimately to individual "persons" 508. A "seat" refers generically to an unidentified individual associated with some education service, request, product, etc. In one instance, "seat" is a "user slot" recognized by the UAS 304 and associated with an "account", such as an accounting firm using professional resource system 302. For example, if an Account purchases a product for ten (10) "users", that product may be associated to up to ten seats. A seat may be purchased but not assigned to a recognized Person or to a non-Checkpoint Learning Person. A seat may also be reassigned based on rules determined through an Account or firm contract or the sales package. "User" refers generically to a person using the various systems while "person" or "individual" refers to a particular person or user having a specific user profile unique to that individual. Associating actions, such as completed courses, with individuals is needed to properly accomplish reporting and credit tracking at the individual level. In conjunction with this the UAS 304, discussed above, facilitates user access to the various leaning services associated with the products 502 and seats 504. In one manner of operation, a firm administrator or the education services system assigns purchased products to seats and assigns purchased seats to persons.

Figure 6:
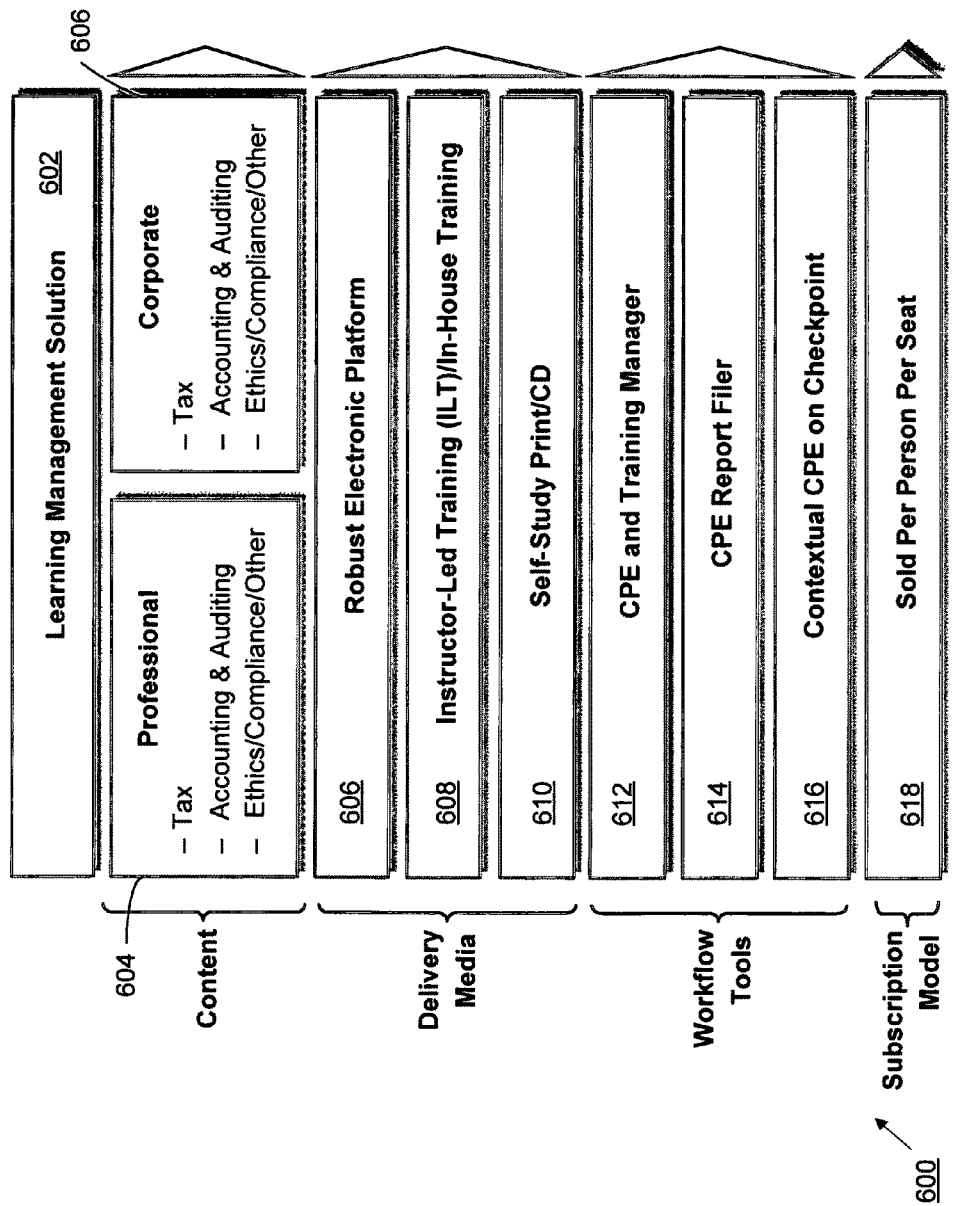
FIG. 6 is a schematic diagram of a primary education services system used in conjunction with the present invention.

FIG. 6 is a schematic illustrating a learning system 600 having a learning management solution (LMS) 602 directed to handling a comprehensive set of learning functions. In this example, LMS 602 is software-based and effectively manages learning content, delivery media, workflow tools, and subscription processing. In this example, the learning management solution 602 is associated with a CPA learning system and content may be segregated, with overlap, based on two types of CPA concerns, professional services entities and corporate entities. Both the professional services category 604 and the corporate category 606 include content related to, for example, tax, accounting and auditing (A&A), and ethics/compliance/other. However, because of the different environments and different needs, the content may be packaged differently and may be focused to meet the particular needs of the different type entities, e.g., internal controls and compliance associated with corporate departments may be more of a focus. The delivery media component of LMS 602 provides a blended learning solution by robust electronic platform 606, ILT and in-house training (IHT) component 608 and self-study component 610. Because persons have particular preferences as to how they prefer to learn and what fits best within their schedules, etc., LMS 602 provides a variety of content delivery media from which users may choose to learn. With ever-increasing bandwidth and storage have followed greater capabilities to offer and deliver dense video and audio content, including in real time. LMS 602 provides a platform, such as media players, real-time streaming, etc., to process video and audio content for efficient delivery for learning purposes while additionally associating such delivery with mechanisms to confirm completion, determine and present status, track historical information, attach course reviews and comments, link course materials to personalized portals, and facilitate reporting of completed courses to appropriate jurisdictions with identified individual names.

LMS 602 is adapted to interface with other professional resource applications to incorporate education-related workflow tasks into practice related workflows. In this manner LMS 602 embeds training into practitioner workflows. Again, this may be accomplished through use of database structures and relationships. In addition, education-specific workflows may be generated and education or practice administrators may have workflows to help manage an entity-wide education program. In this example, LMS 602 includes workflow tools to help implement CPE and training management 612, CPE reporting and filing 614, and contextual CPE in professional resource systems 616, e.g., CHECKPOINT. For instance, a firm education/training administrator may have workflows set up to help monitor learner progress against plan or path and to periodically prompt action associated with CPE requirements deficiencies. A workflow may result in a report being generated that lists individual users, e.g., employees, that are short on credit hours reported during a requirements period and having an upcoming requirements period cut-off or end date. The workflow may further include mechanisms with which the administrator issues warnings and/or directives to such individuals to prompt corrective action to avoid possible license-related problems. This also can be used to prompt early action to avoid increases in costs and to promote CPE relevancy by avoiding courses taken "last minute" simply to satisfy requirements and not more efficiently driven to address a more thoughtful professional development goal.

LMS 602 may provide users with the ability to create learning paths tailored to the individual's self-directed goals or aspirations or as directed by a firm based on anticipated future needs. Workflows may be used in creating and implementing such learning and career paths. The subscription component 618 of LMS 602 provides subscription related functions associated with CPE courses. For example, if a CPE offered by a particular education services provider is not covered under an existing contract associated with the user account making a request, then the user may be presented with a way to register and pay for the course. The system may be set up to disable selection of courses not covered under existing contracts or may offer alternative courses that are covered under existing contracts. The system may also provide availability information, e.g., number of seats remaining unsold.

Figure 7:
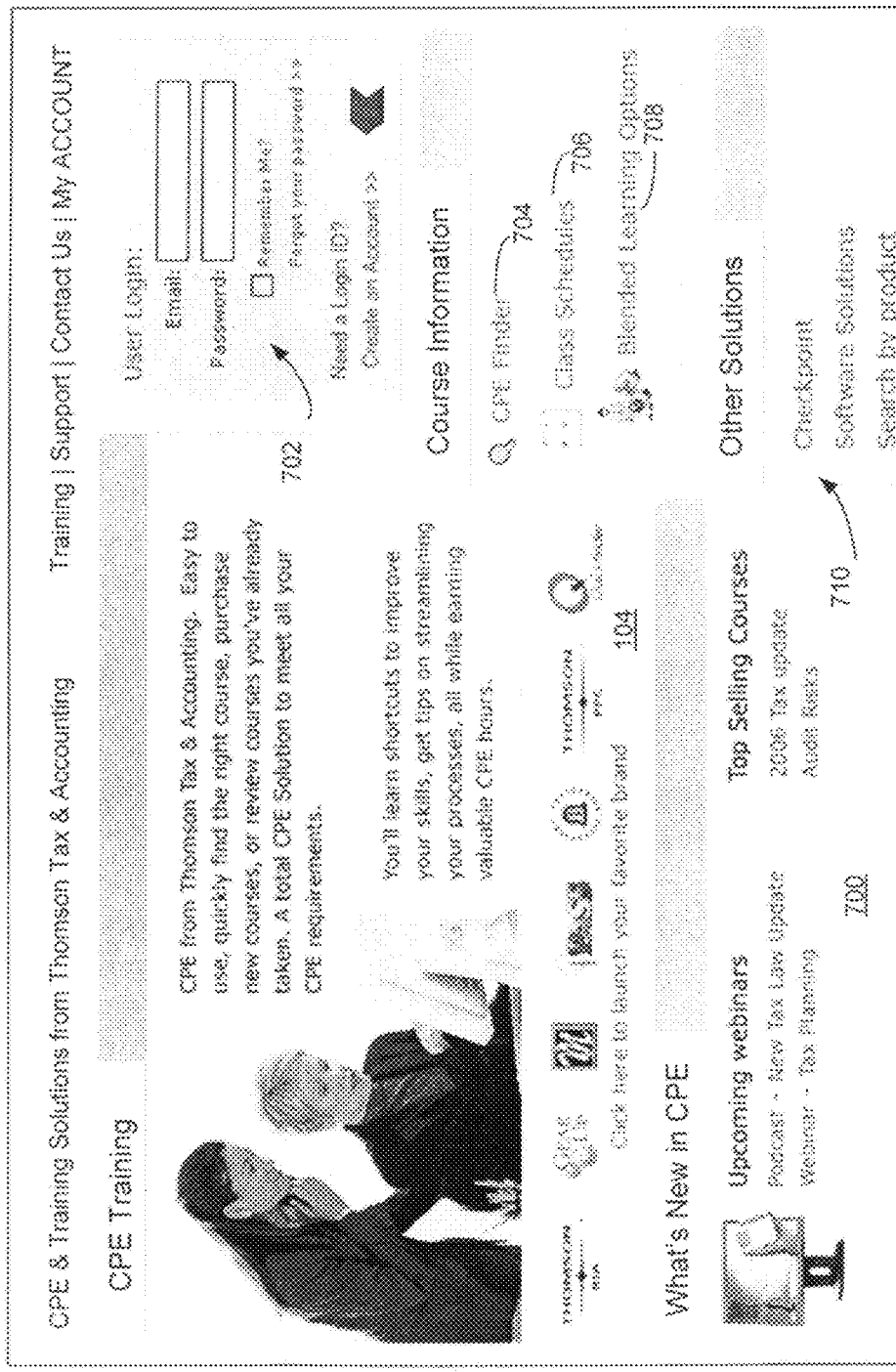
FIG. 7 depicts a user interface associated with creating a user account for access to the primary education services system.

FIG. 7 depicts an exemplary initial login interface screen 700 associated with a CPE education system, such as primary education access system 125 of FIG. 1. A user is presented with a login interface 702 and, in this case, enters the user's email address and password. If the user does not have an existing account, then the user may create an account from this interface. CPE course information and functionality is provided in the way of CPEFINDER 704, class schedule/calendar 706 and learning options function 708. This screen provides the user with icons, which may include hyperlinks, for various education service providers or systems, e.g., RIA, GEARUP, MICROMASH, PASSONLINE, Bell, PPC and QUICKFINDER. In addition, links to other solutions, such as professional resource system CHECKPOINT, are provided at 710.

Figure 8:
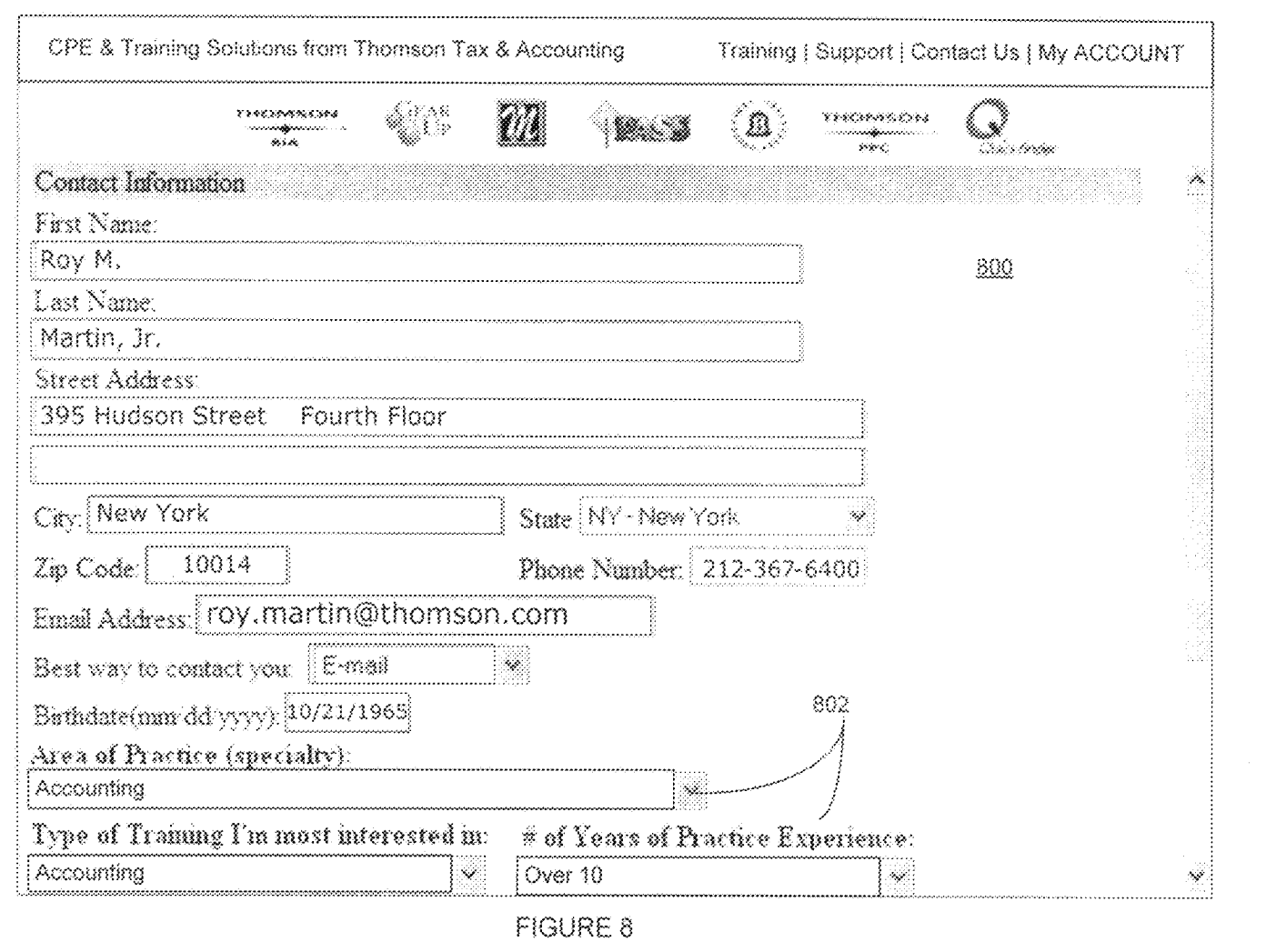
Figure 9:
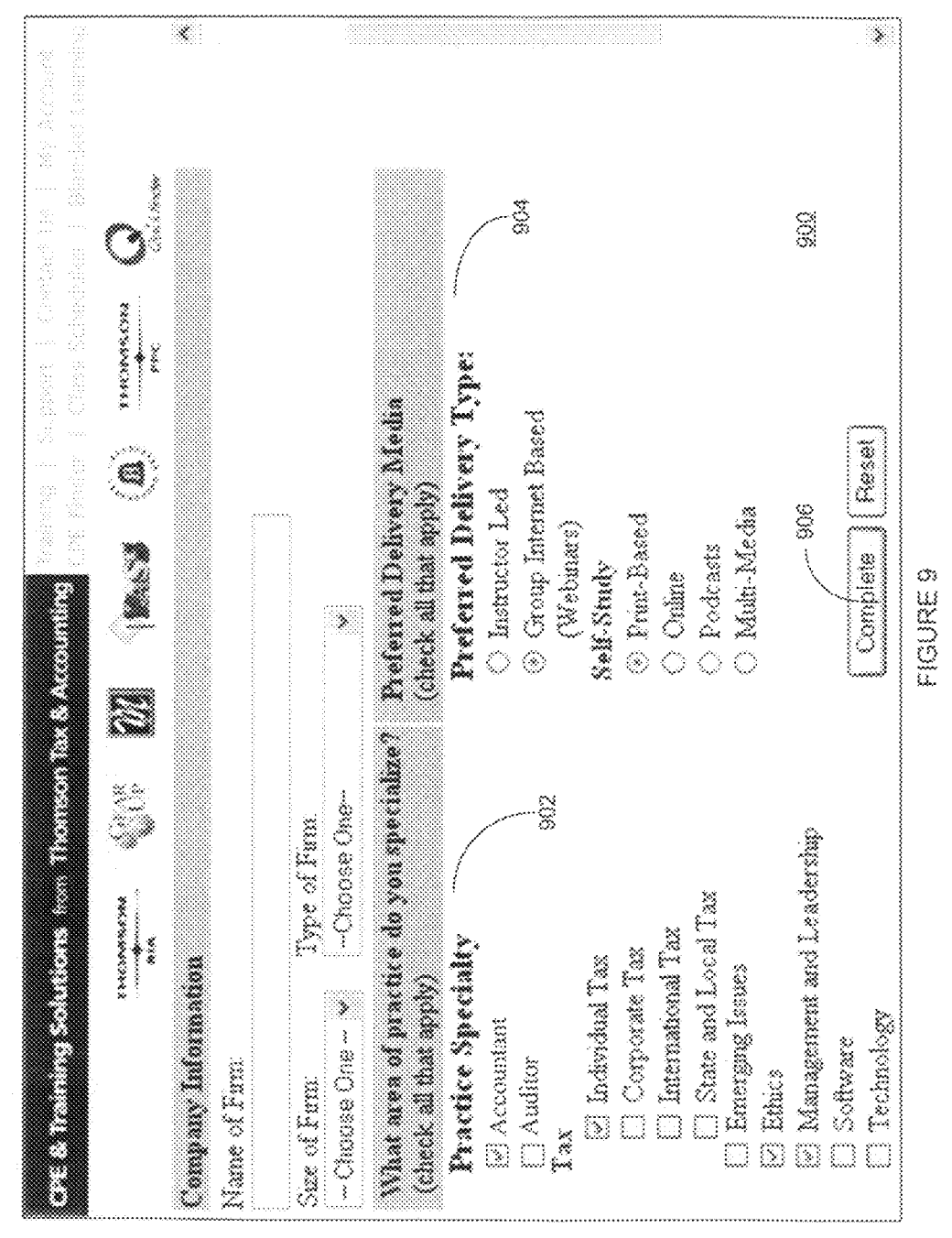

In FIG. 8, illustrates an account creation screen 800 in which a user account for an individual, "Roy Martin," is created by inputting information in fields presented. Also included in this user interface screen are professional practice related fields 802 for "Area of Practice (specialty)", "Type of Training I'm Most Interested in", and "# of Years of Practice Experience." FIG. 9 depicts a second user account creation screen 900 in which further information is collected from the user including "Practice Specialty" 902 and "Preferred Delivery Type" 904. In this example, the user has selected "Accountant" as the practice specialty with "Individual Tax," "Ethics," and "Management and Leadership" as areas of practice in which the user specializes. The user has also selected "Group Internet Based (Webinars)" and "Print-Based" self-study as the preferred delivery types for education content. Upon completion, the user clicks "complete" button 906 and the system creates a user account associated with that individual, in this example Roy Martin.

Figure 10:
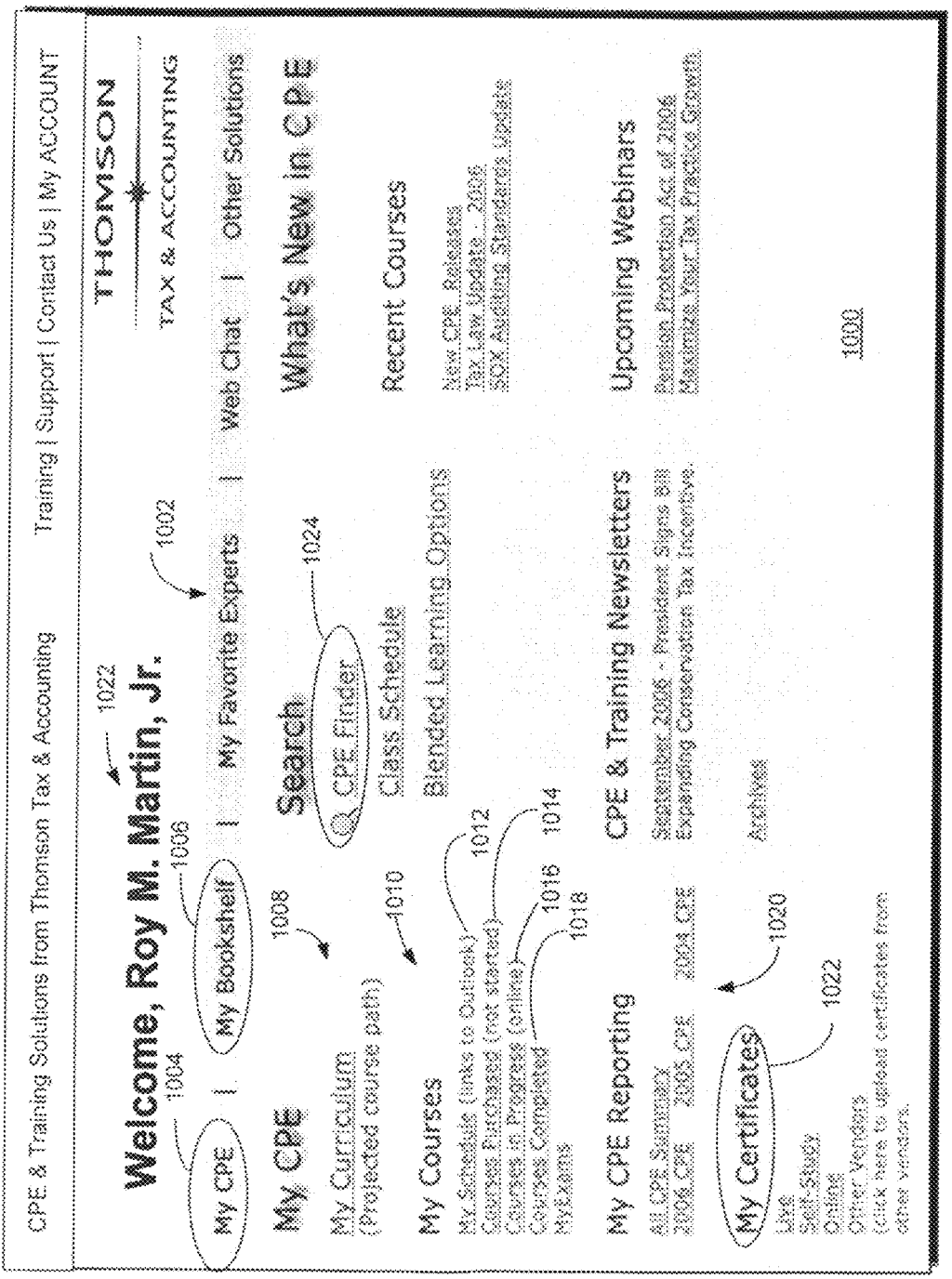
FIG. 10 depicts a user interface representing a dashboard for an individual user profile in conjunction with the present invention.

FIG. 10 depicts a personalized education portal or webpage 1000 associated with an individual user account, in this example for an individual named Roy Martin. The portal acts as a "one-stop" personalized navigator that presents user information and enables easy navigation to education and training related events and services as well as navigation to other areas. The "My CPE" homepage 1000 is presented upon login on the system or upon linking to the webpage via a professional resource application adapted to automatically, such as by way of an SSO process, enable access to this education services system and associated user interface. The personalized user interface screen 1000 includes tabs 1002, including My CPE 1004 and My Bookshelf 1006. The screen displays personalized content and links such as for My Curriculum 1008, My Courses 1010, My CPE Reporting 1020, and My Certificates 1022. User interface screen 1000 also displays Search functionality, including CPEFINDER 1024, CPE and training newsletters, and new CPE and training related offerings. Associated with My Courses 101 is My Schedule 1012 (see FIG. 15), Courses Purchased (not started) (see FIG. 18), Courses in Progress (online) (see FIG. 19), Courses complete (see FIG. 20), and MyExams. My CPE Reporting 1020 in whole or in part automates the reporting process. After completion of a CPE course, the system includes processes to implement reporting of the course to jurisdictions associated with the individual completing the course. The database includes user profiles and has associated with each individual that person's bar number or board number or other assigned number to facilitate both reporting of the course for credit to that individual to the one or more jurisdictions. Likewise, the system can confirm electronically that the jurisdiction has credited the individual with the CPE, CLE or other such credits, update the user profile and database to reflect the credit awarded, and present the information to the user via the dashboard 1000, which is an example of portal 402 of FIG. 4.

Figure 11:
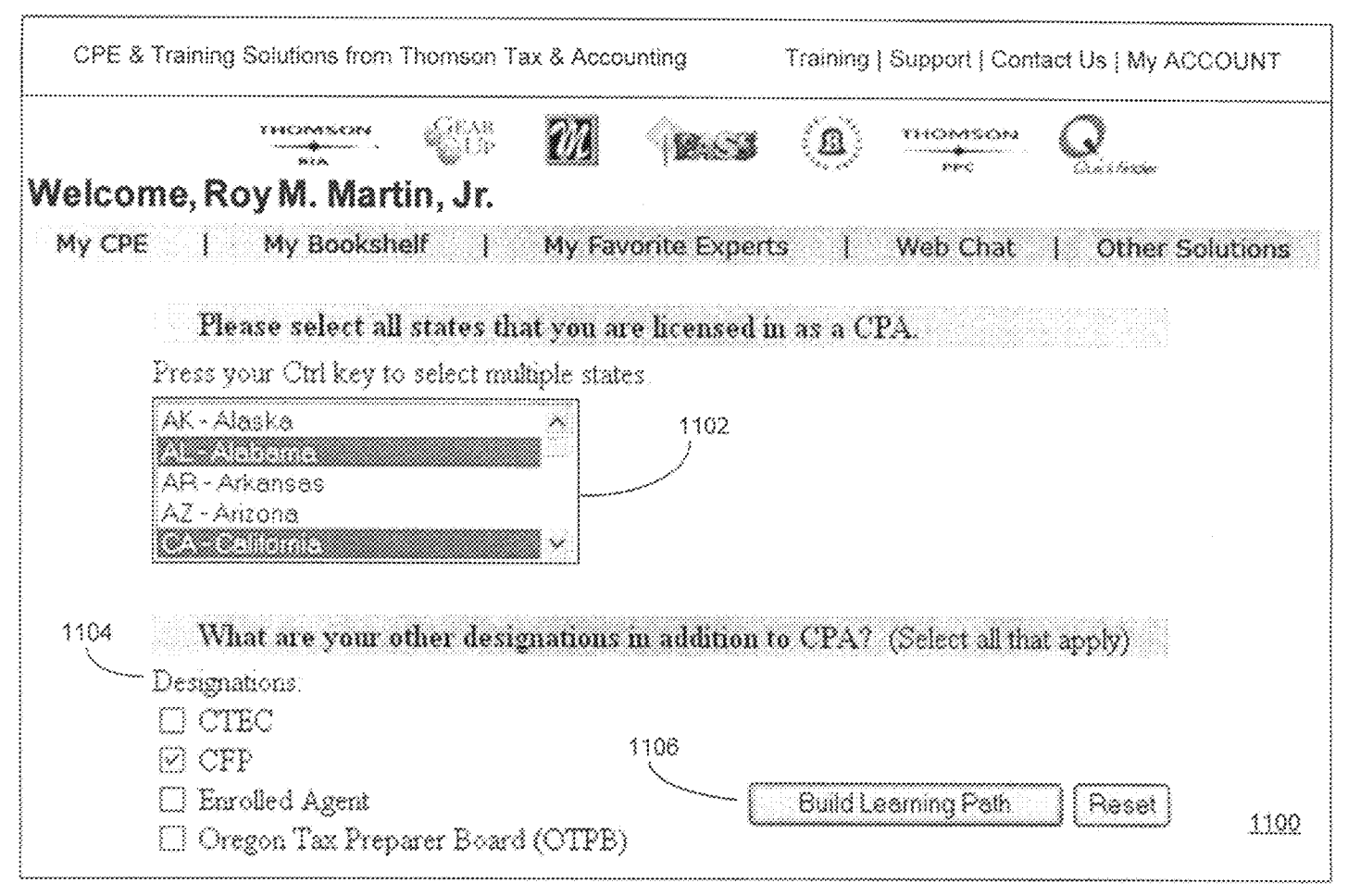

FIG. 11 depicts and exemplary page associated with My Curriculum 1008 from dashboard 1000. My Curriculum screen 1100 provides an interface for users to set preferences that allow the software to provide customized curriculum based on the user selections/input. Screen 1100 includes a data entry user interface 1102 for selecting one or more states or other jurisdictions in which the individual associated with the account. In this example, the screen relates to CPA licensure for user Roy Martin, who is licensed in Alabama and California. Additional professional designations are input at user interface 1104, in this example "CFP" has been selected as a professional designation associated with individual Roy Martin. By setting the appropriate states/jurisdictions and professional designations the system next determines what courses need to be taken by the individual, or at least that are suggested for taking. The user may click on the "Build Learning Path" button 1106 upon inputting all responsive information.

FIG. 12 depicts a user interface screen 1200 that represents a default learning profile based on personalized information provided by the user as well as requirements or other data provided by the entity, e.g., professional services firm or corporation. Default Learning Path Criteria are present in area 1202 including firm directed requirement "KPMG Required: Professional Conduct." "Area of Practice" corresponds to "Accounting", "Training most interested in" corresponds to "Accounting", and "# of years of experience" corresponds to "over 10" as selected by the user at screen 800 of FIG. 8. "Practice Specialties" corresponds to "Accountant, Individual Tax, Ethics and Management" and "Preferred Media" corresponds to "Webinars, Print-Based" as selected by the user at screen 900 of FIG. 9. "State requested" corresponds to the states selected by the user, Alabama and California and "Other Designations" corresponds to "CFP" as selected by the user at screen 1100 of FIG. 11. Links to other learning paths saved by the individual are also provided. The system provides functionality "Build New Learning Path" for the user to create and save user-defined learning paths and in this example three such previously created and saved paths are shown in area 1204.

As reflected in the screen 1300 of FIG. 13, the system presents the user with a suggested learning path based on the user's learning profile that, for example, meets the user's short-term career goals. The suggested curriculum or learning path may be tailored to state requirements, job functions, and career path. In this example, screen 1300 presents a learning path comprising coursework to result in 30 hours of CPE credit for completion within one year—short-term. From this screen the user may view learning path criteria via link 1302 or may change learning path criteria via link 1304. Immediate goal 1306 and other goals 1308 are provided to allow the user to enter and save user defined goals. The suggested learning path screen includes a listing of courses 1310 that includes information and links concerning the suggested courses. The system provides users with what appears to be a seamless, integrated education management system complete with links beyond the system to education service provider's products. This saves users significant time from having to search multiple education service providers to identify courses relevant to practice area and specialties in their practice and provides employers an efficient system to help shape, direct and track employee professional development. In addition, the system can display intermediate (e.g., 12-24 months) and long-term (e.g., 36-48 months) learning paths. FIG. 14 depicts a dashboard learning path screen 1400 that shows the status for each of the learning path courses, e.g., not started, not completed, completed, along with an overall status of the goal completion, e.g., 4 of 30 hours—13%.

Figure 15:
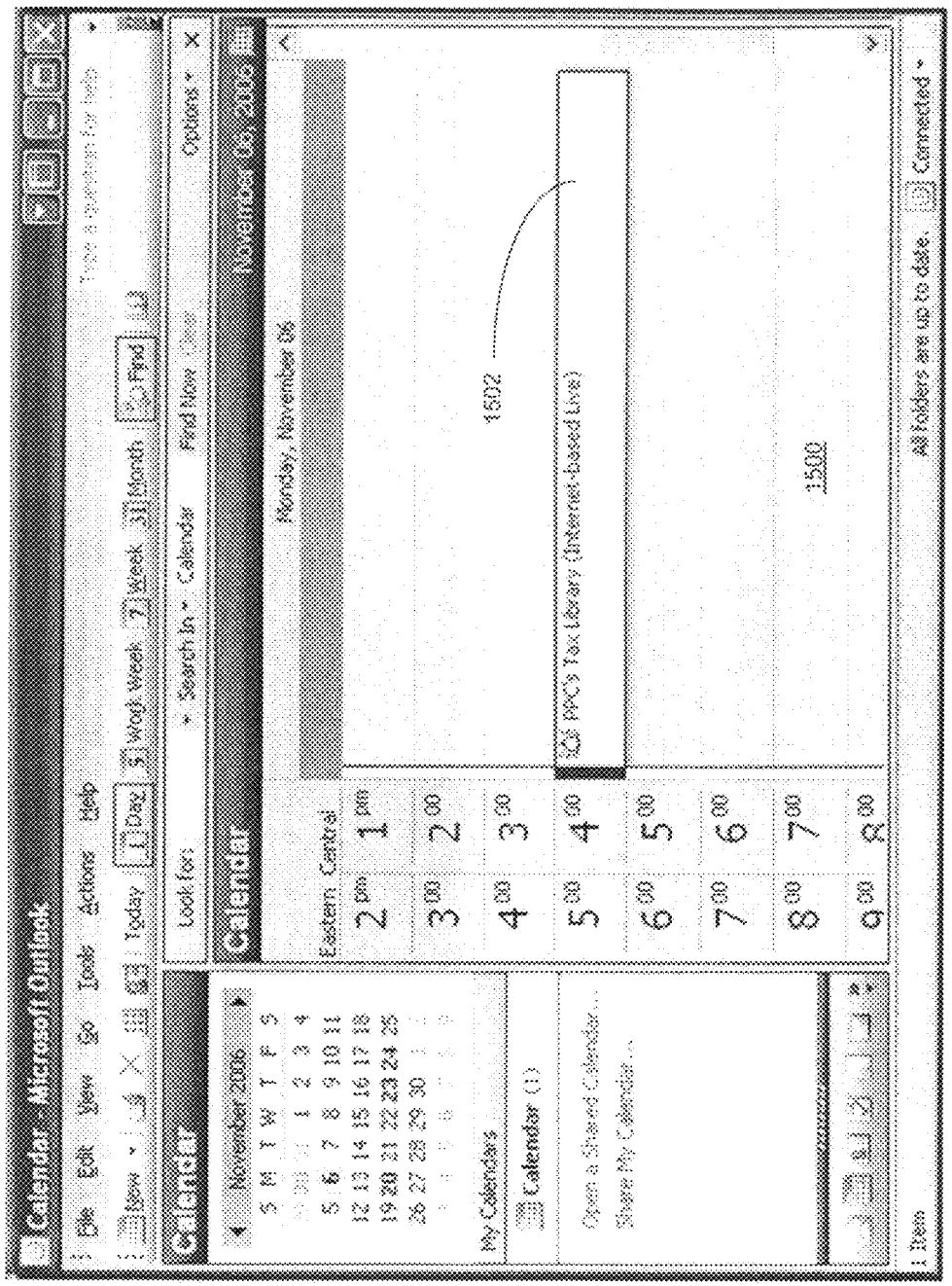
FIG. 15 depicts a screenshot representing an Outlook calendar with CPE course entry associated with a CPE course registered in conjunction with the present invention.
Figure 16:
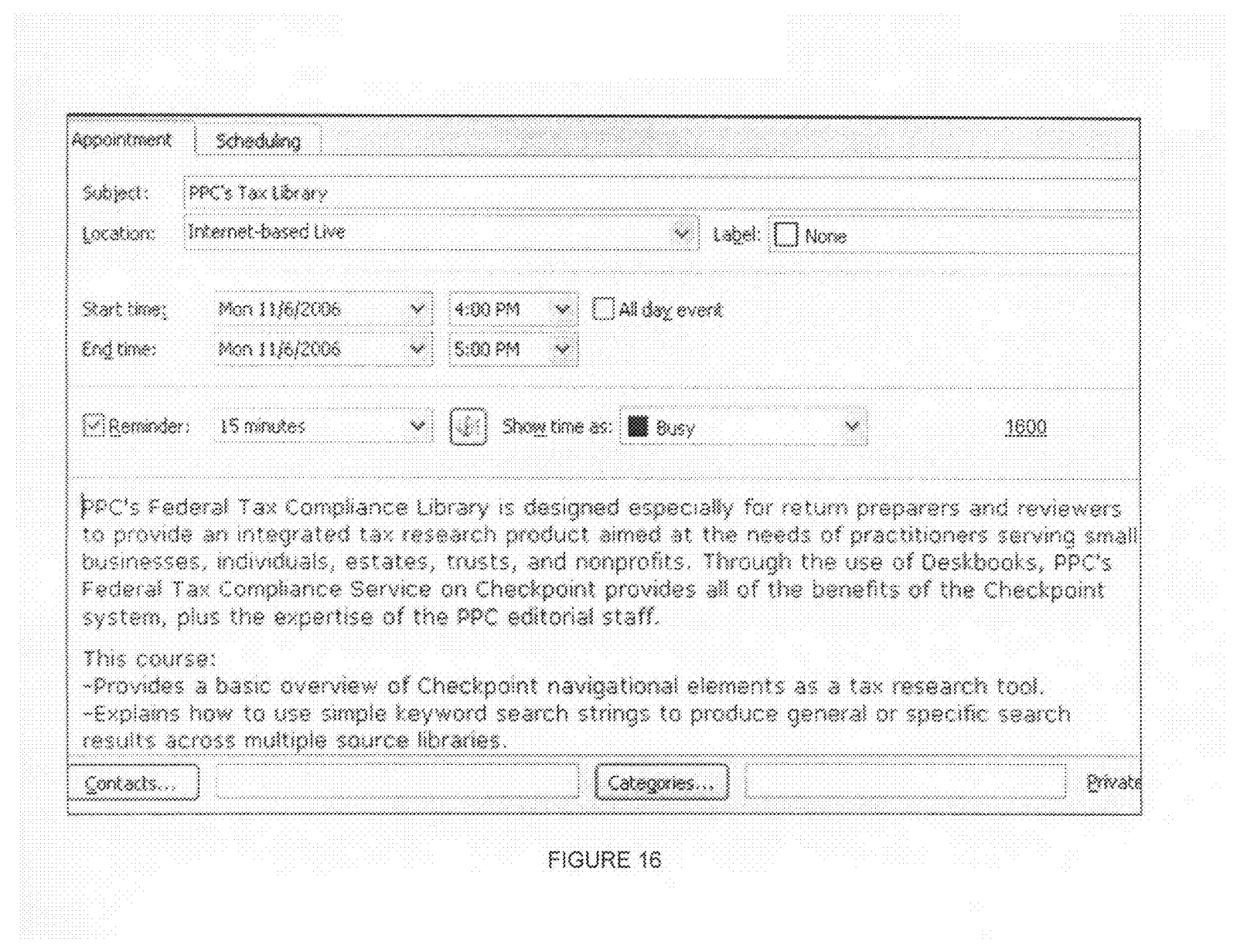
Figure 17:
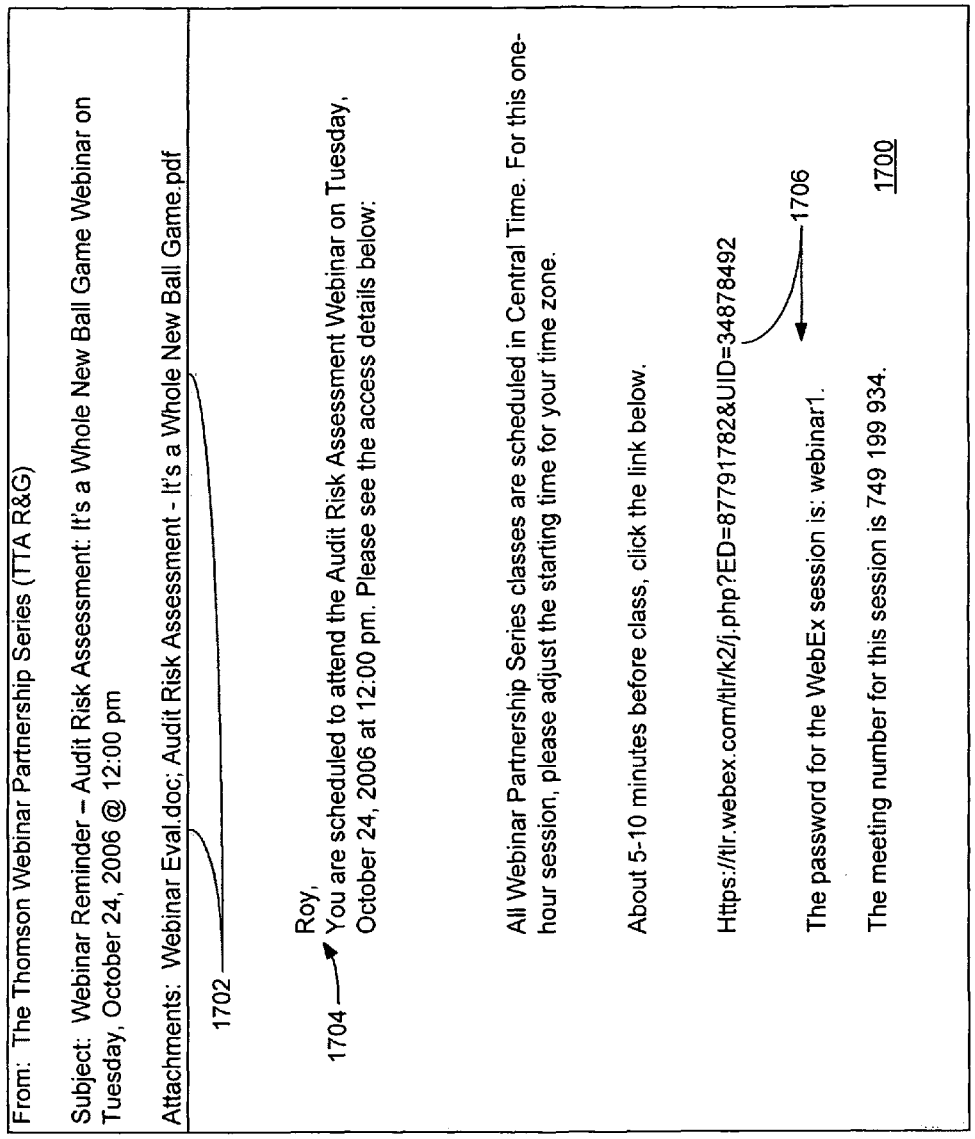
FIG. 17 depicts a screenshot representing an email message delivered to a user account associated with CPE course registration.

FIG. 15 depicts a screenshot 1500 of an Outlook calendar showing an entry 1502 associated with the My Schedule function 1012 of FIG. 10. The system is integrated with software applications such as Microsoft Office Suite including Outlook to automatically generate entries associated with individual profiles, e.g., calendar entries. In this manner the system facilitates integration of education and training services within an enterprise facility. In this example the user's calendar is updated to reflect a scheduled course, PPC's Tax Library (Internet-Based Live), for which the user has registered to attend. FIG. 16 depicts a screenshot 1600 showing a detailed appointment associated with the entry 1502 giving more information regarding the course and may include instructions necessary to complete the course, directions, links to materials and other resources associated with the course, the course instructor, the participants access information and other items of interest. In addition, as shown at FIG. 17, the system may generate automatic emails or other reminders, such as email 1700, at time of registration and/or periodically up to and following the date of the course. This message may also include attachments 1702, instructions 1704, directions, links to course and materials and access information 1706, and other resources associated with the course, the course instructor, the participants, and other items of interest.

Figure 18:
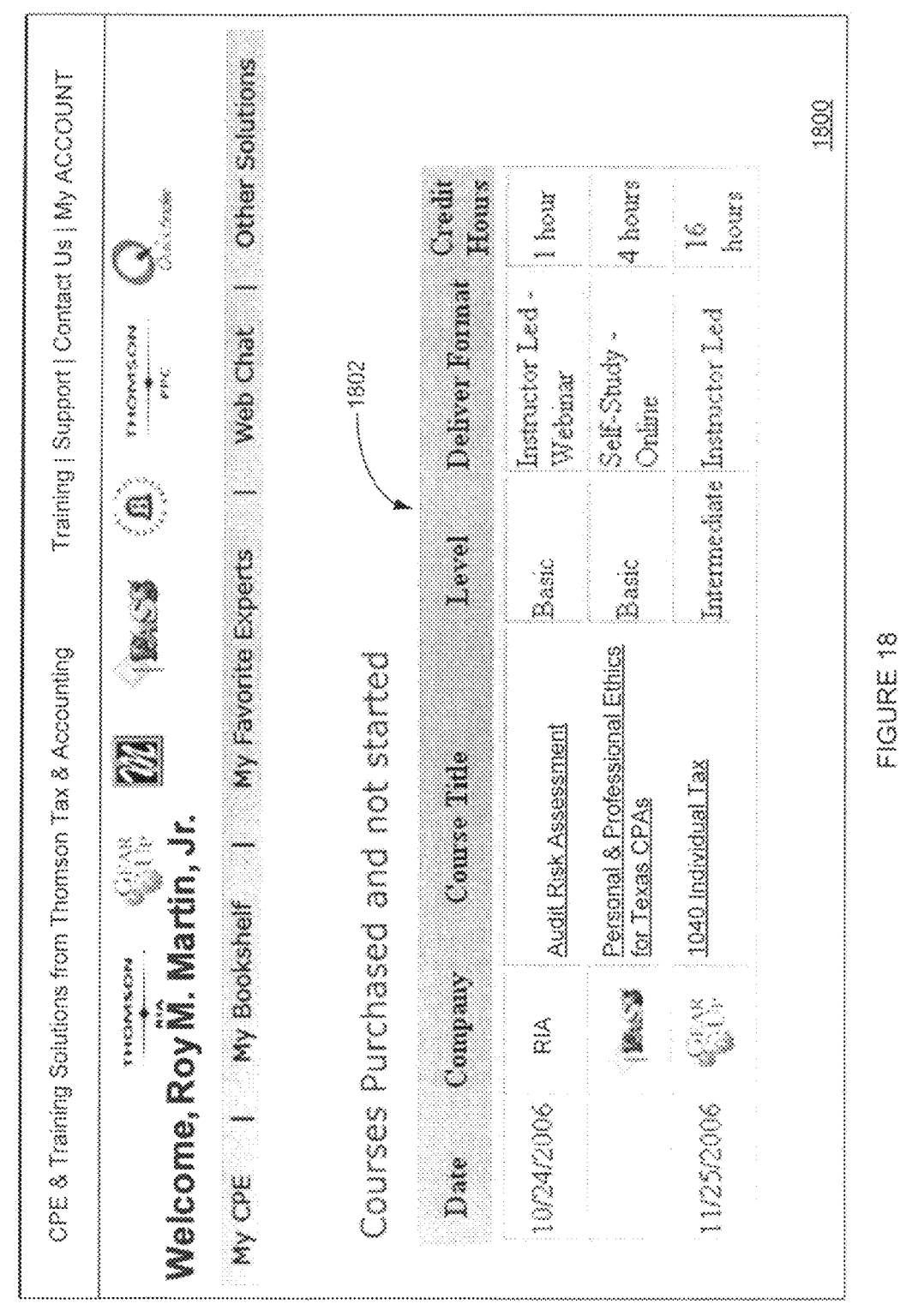
Figure 19:
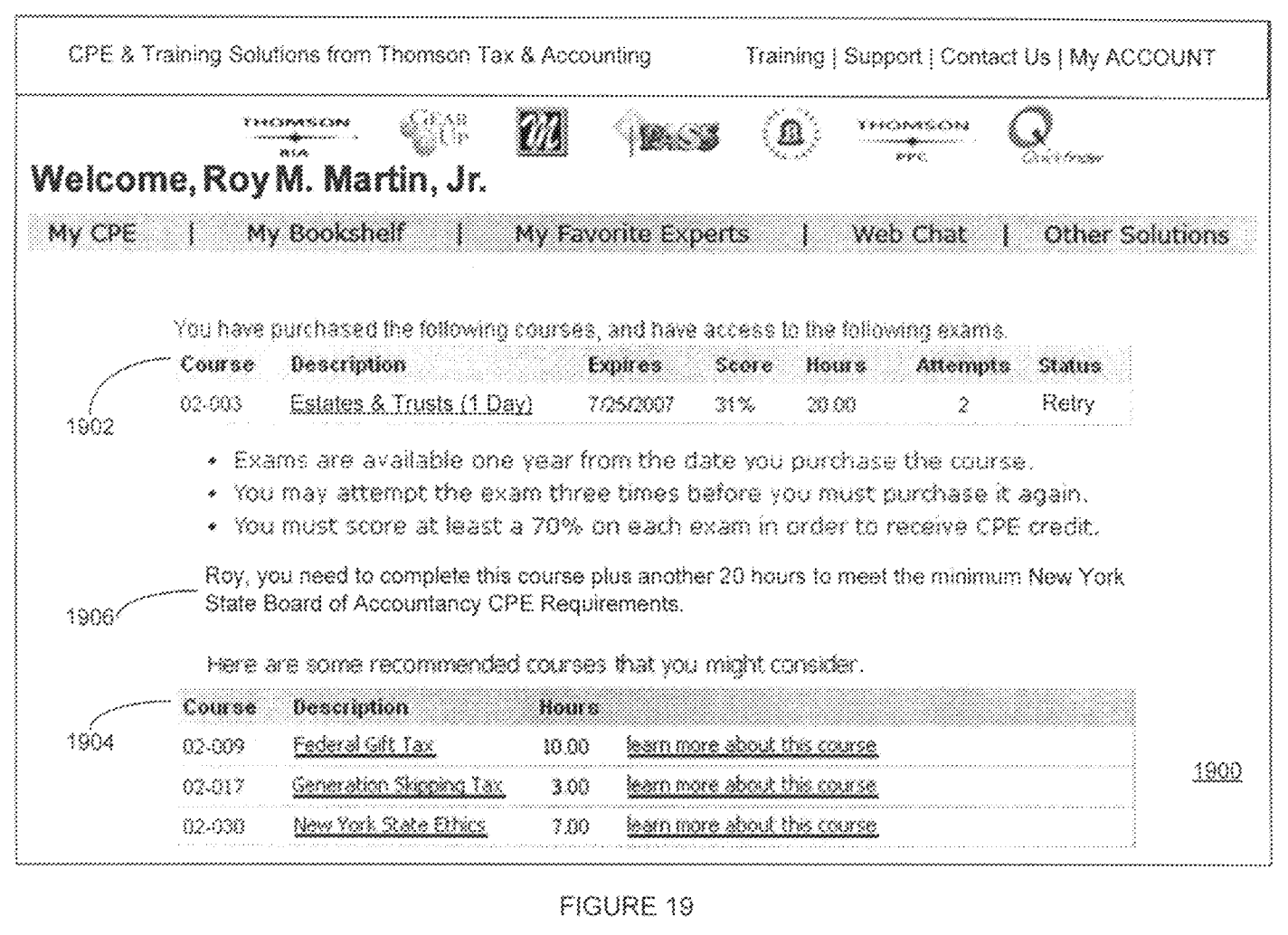
Figure 20:
FIG. 20 depicts a user interface associated with a course completion function of the dashboard of FIG. 10.

FIG. 18 depicts a user interface screen 1800 associated with the Courses completed (not started) function 1014 of FIG. 10. A list 1802 of courses purchased but not started is presented with information about the course such as described hereinabove. FIG. 19 depicts a user interface screen 1900 associated with the Courses in progress function 1016 of FIG. 10. A list 1902 of courses purchased is presented to the user with a information concerning the score thus far achieved, expiration date for the course, number of attempts, and status with a link to retry the exam associated with successful completion of the course. The system generates a message 1906 to the individual user, Roy Martin, indicating that after completion of the listed course the individual has an additional 20 hours of CPE to complete in order to meet minimum requirements for a jurisdiction, in this case New York State Board of Accountancy. The system further generates and presents via user screen 1900 a list 1904 of recommended additional courses, preferably at least enough to meet minimum requirements and derived from information maintained in the user profile and/or learning path, for the individual to consider in meeting his requirements. Links associated with the recommended courses directing the user to the education services system of the provider of the respective course is provided to facilitate the selection and registration process. FIG. 20 depicts a user interface screen 2000 associated with the Courses Completed function 1018 of FIG. 10. A list 2002 of courses purchased and completed is presented with information about the course, e.g., score, hours, attempts, description, dates and status. The system generates a message 2004 to the individual user, Roy Martin, indicating that he has met the requirements for a jurisdiction, in this case the annual requirements for the New York Society of CPAs.

Figure 21:
FIG. 21 depicts a user interface associated with a course builder function of the dashboard of FIG. 10.

The education services system also may include an in-house, or otherwise, CPE course creation component. For example, FIG. 21 depicts a course builder user interface 2100, which may be available to administrators or to professionals who serve as instructors, but is not limited to such persons. Using the course builder interface, a user selects the Type of Course to create, reload or update at interface 2102 and selects course preferences at interface 2104. In this example, the user has selected to create a new course of the self-study type that meets National Association of State Boards of Accountancy (NASBA) and Quality Assurance Service (QAS) CPE requirements and that includes supplemental information such as information from the firm creating the course. For example, firms such as KPMG, PricewaterhouseCoopers, Ernst & Young, and Deloitte Touche Tomatsu may desire to create courses to present to clients and prospective clients or for professional conferences and may wish to include firm related information along with the technical subject matter as a way of promoting business development. In addition, the course builder function may be used by traditional education services providers, such as MICROMASH, PASSONLINE, RIA, PPC, etc., to develop course offerings and such providers may desire to place information about the provider in the course materials.

FIG. 22 depicts a course loader user interface 2200 that includes a content loading interface 2202 for loading previously developed content, such as questions, quizzes, exams, etc., into the course being created. User interface 2204 allows the user to import content, for example existing files, for use in the course being built. Such files may be previously developed for general use, for use with prior courses, or generated by the user for use in the new course. The user uses the browser function to locate and attach the file to the course or course record. An additional feature allows the user to generate questions based on keywords found in the course materials. This may be accomplished in a number of ways, for example by selecting from previously developed questions associated with certain topics, e.g., Sarbanes-Oxley Act, regulatory provisions, standards sections, etc., or by locating in the materials key words for testing and deriving questions based on the search.

Figure 23:
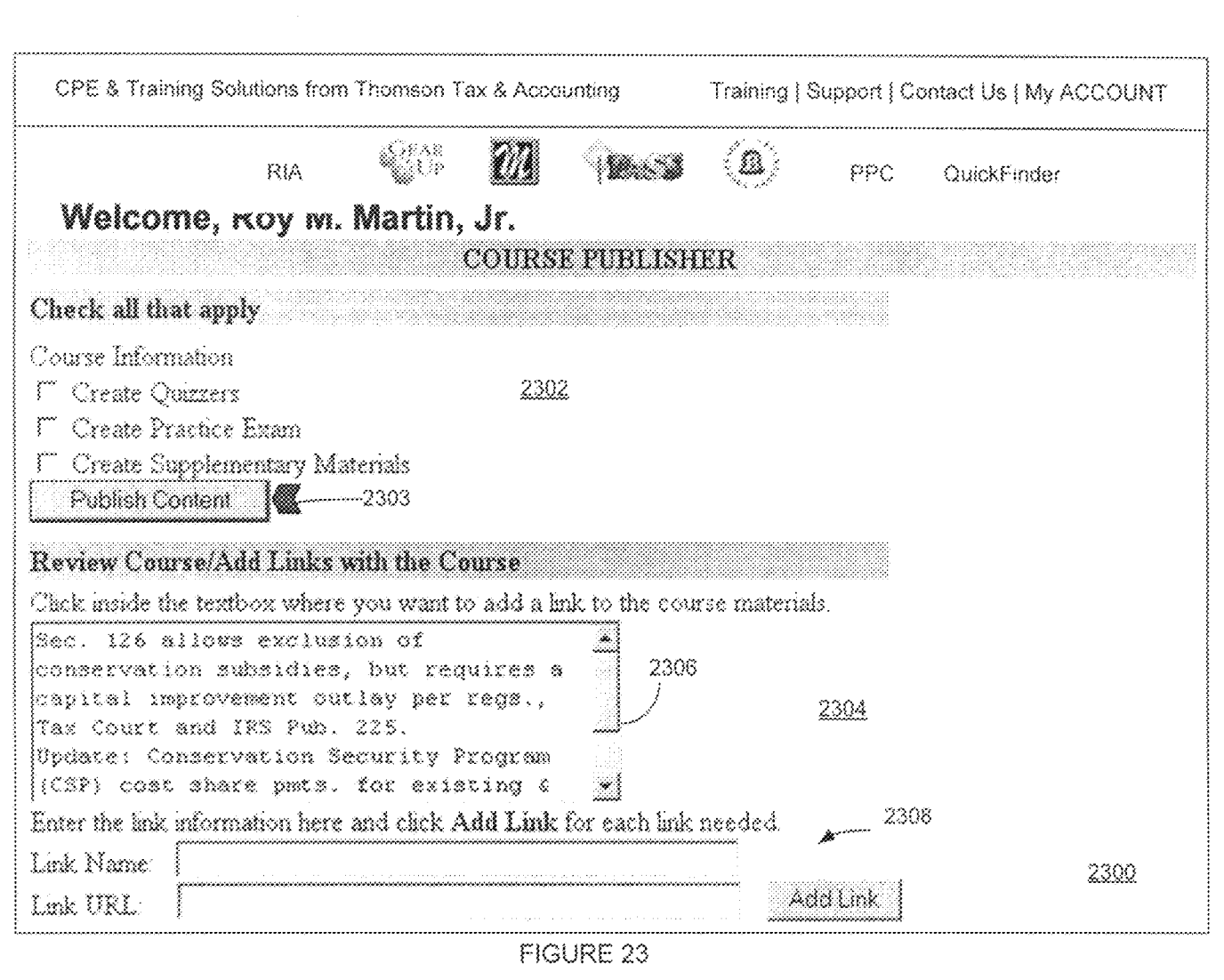

FIG. 23 represents a course publisher user interface 2300 for publishing the course being created using some medium or media. In this example, user interface 2302 enables a user to select from creating quizzes, practice exams, and supplementary materials for use with the course. User interface 2304 includes a textbox 2306 and link name and URL fields 2308 whereby, for instance, a user may add links to course material.

FIG. 24 depicts an administrator screen 2400 associated with a particular user, Brian Hall, for instance a learning supervisor or administrator, for viewing the progress of students/learners via the learning system. The administrator is associated with a set of students/learners via a database and is presented with the assigned set of students when viewing this page. In this example, students or learners associated with Brian Hall as supervisor or administrator are Roy Martin, Mark Schlageter, Bill Smith, and Jane Jones. Rather than associating individuals with a supervisor, the system may associate the supervisor with a particular department, business unit, area of specialty, location, etc. In this exemplary screen, the supervisor is presented with the following progress information, % complete, hours completed, hours in progress, and hours not started. This progress may relate to an established learning path associated with each individual. Upon selecting a particular student, the system will present to the supervisor more detailed information concerning that student. In addition, the system may present administrators or supervisors with metrics or measures of learners against peer group data or historical peer group data to better enable comparison and identifying areas of success and deficiency. The system may be set up to deliver e-Alerts to individuals with copy to supervisor for impending licensure and other deadlines.

FIG. 25 is an exemplary user interface screen 2500 associated with the My CPE Reporting function 1020 of FIG. 10 and the electronic report filer aspect of the education services system. The system records CPE credits from education services providers and automates in whole or in part the process of reporting the CPE credits to jurisdictions. In this example, the screen is associated with an individual user, Roy Martin, and includes a CPE history in the form of summaries of CPE hours for years 2004-2006, 2502-2506 respectively. The year-by-year summaries may be expanded, 2504 and 2506, to reveal the particular courses taken and completed by the individual and the number of hours for which credit was received as well as additional information. The system generates a message 2508 to indicate for a given jurisdiction and/or time period the status of meeting requirements associated with renewal of professional licenses. The summaries can also be by state, where the user is licensed in more than one state or jurisdiction. The user interface 2500 provides a mechanism for printing CPE license renewal report to assist in filing of the CPE license renewal reports. Preferably, the system employs a method for connecting with licensure authorities to electronically e-file license related reports and documents for license renewal.

The education services system includes a CPE search function or interface, shown as CPEFINDER 1022 in FIG. 10, whereby a user may search one or more databases/education services providers from the MyCPE portal. FIG. 26 represents a screenshot 2600 depicting the results of searching in the field associated with CPEFINDER 1022 of FIG. 10 with the term "retirement." In this example, nine documents were uncovered in the search. For each of the courses identified by the search, the system lists the following information, Brand, Price, Print, Comp, ILT, Inhouse, and Hours. Links are provided with at least some of the courses presented to enable the user to link directly to web pages that describe the courses in greater detail and provide additional information for registration.

Figure 27:
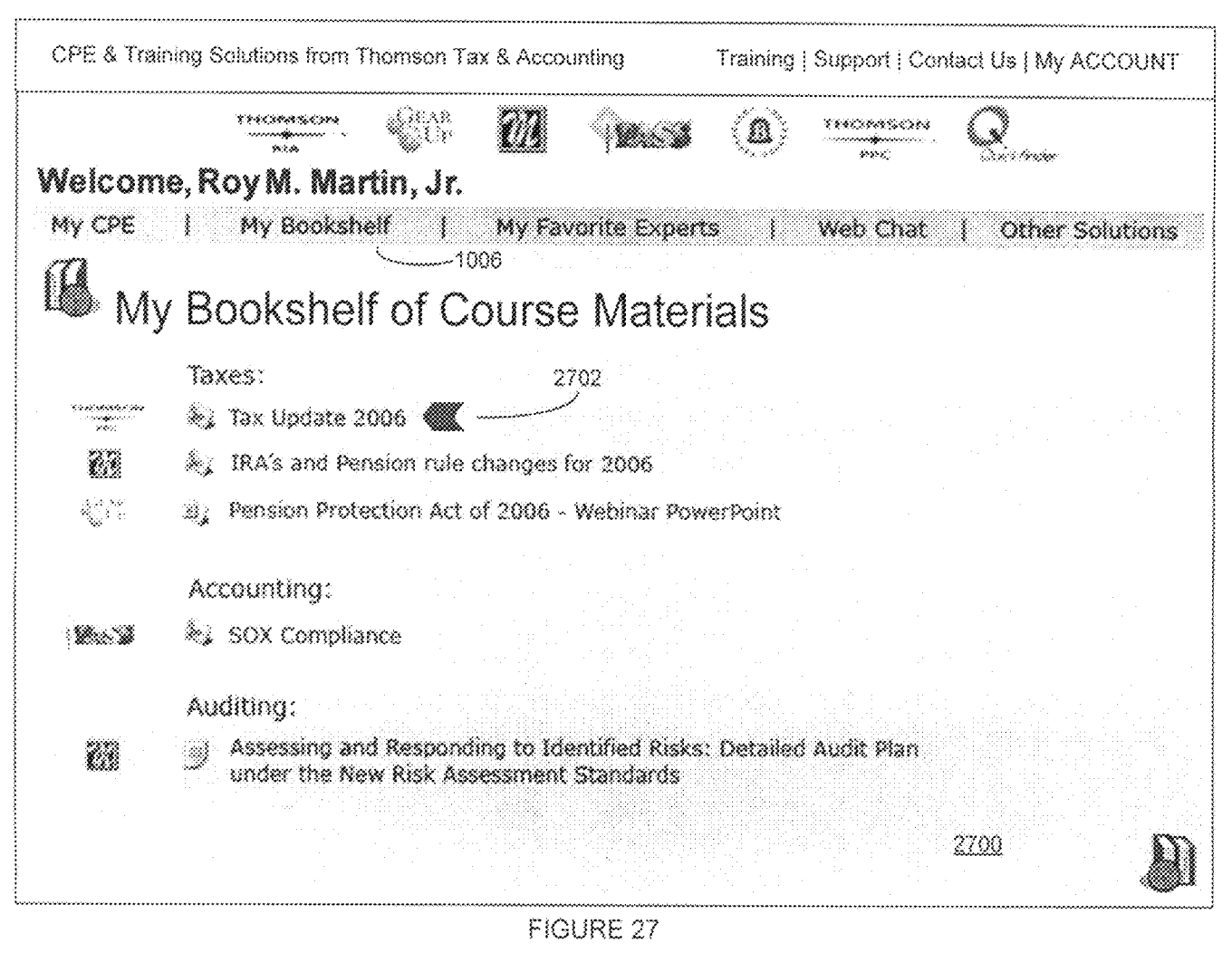

FIG. 27 depicts a user interface screen 2700 representing the CPE dashboard link—My Bookshelf, tab 1006 of FIG. 10, webpage associated with an individual's account, in this case Roy Martin. This interface allows users to retain course related information for later reference and use. In this example, course materials for three tax related courses, one accounting related course, and one auditing related course are made accessible to the user. A user can select a desired course material, e.g., Tax Update 2006 2702, by clicking on the link. The browser will open a window for presenting, in this case, an Adobe document in .pdf format.

Figure 28:
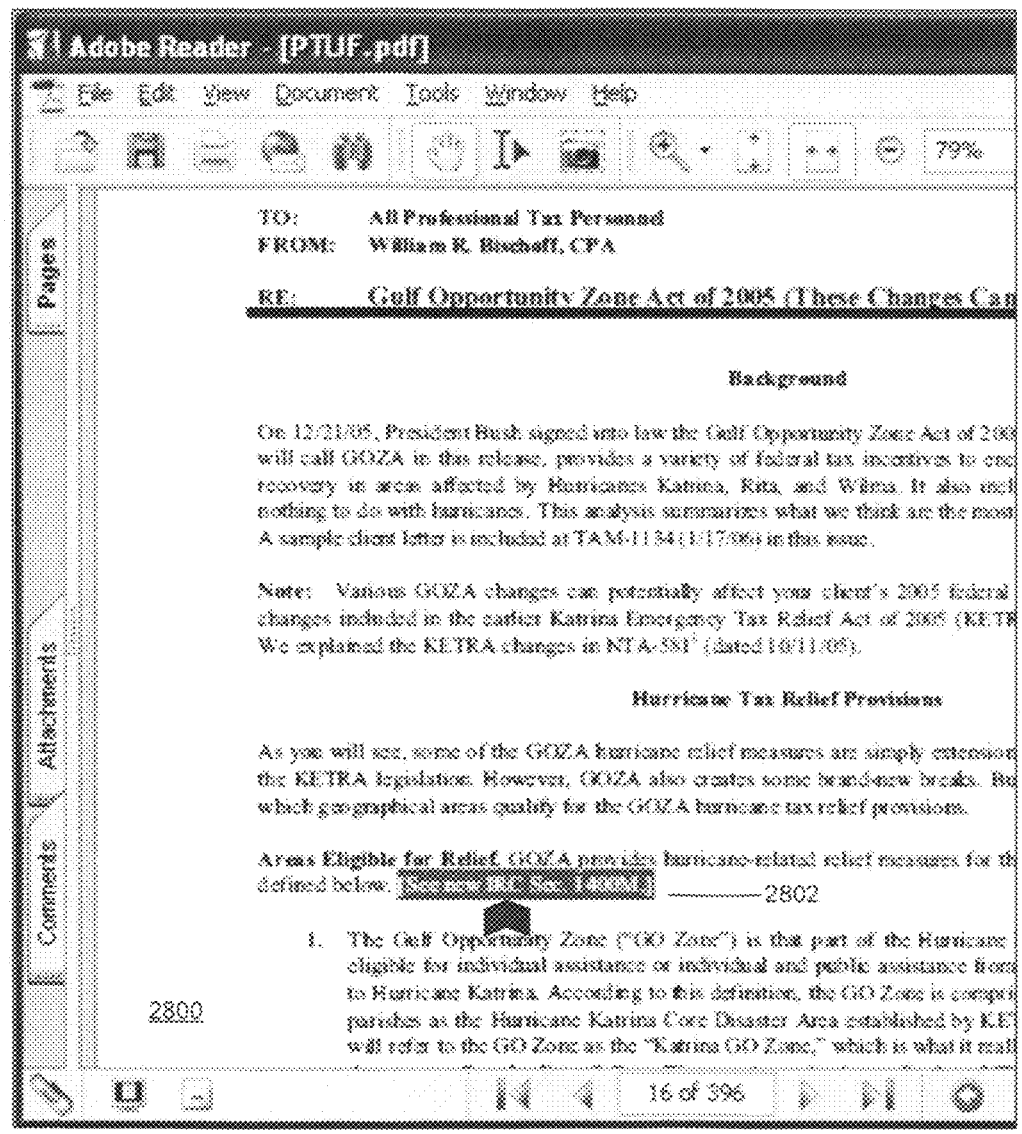
FIG. 28 is a screenshot of a document having embedded links for linking between the education services system and a professional resource system in conjunction with the present invention.

FIG. 28 depicts a screenshot 2800 showing one page, 16 of 396, from the document 2702 selected in FIG. 27. In this manner a user can search course manuals and other materials for specific references to, for instance, an IRC code of interest and find links to information available from other sources related to that subject. In this example, the course document includes a link 2802 to take the user outside the learning system and to a professional resource system or a document from such system, such as CHECKPOINT, to view information concerning the subject of the citation or other item linked. Links in course materials, including online courses and materials, may be made to, for instance, primary source materials, PPC Guides, etc. In this case the citation is to IRC (Internal Revenue Code) Sec. 1400M and the link connects the user to the professional resource service, e.g., CHECKPOINT, to review the information found at CHECKPOINT. This may be in the form of opening into a new window.

Figure 29:
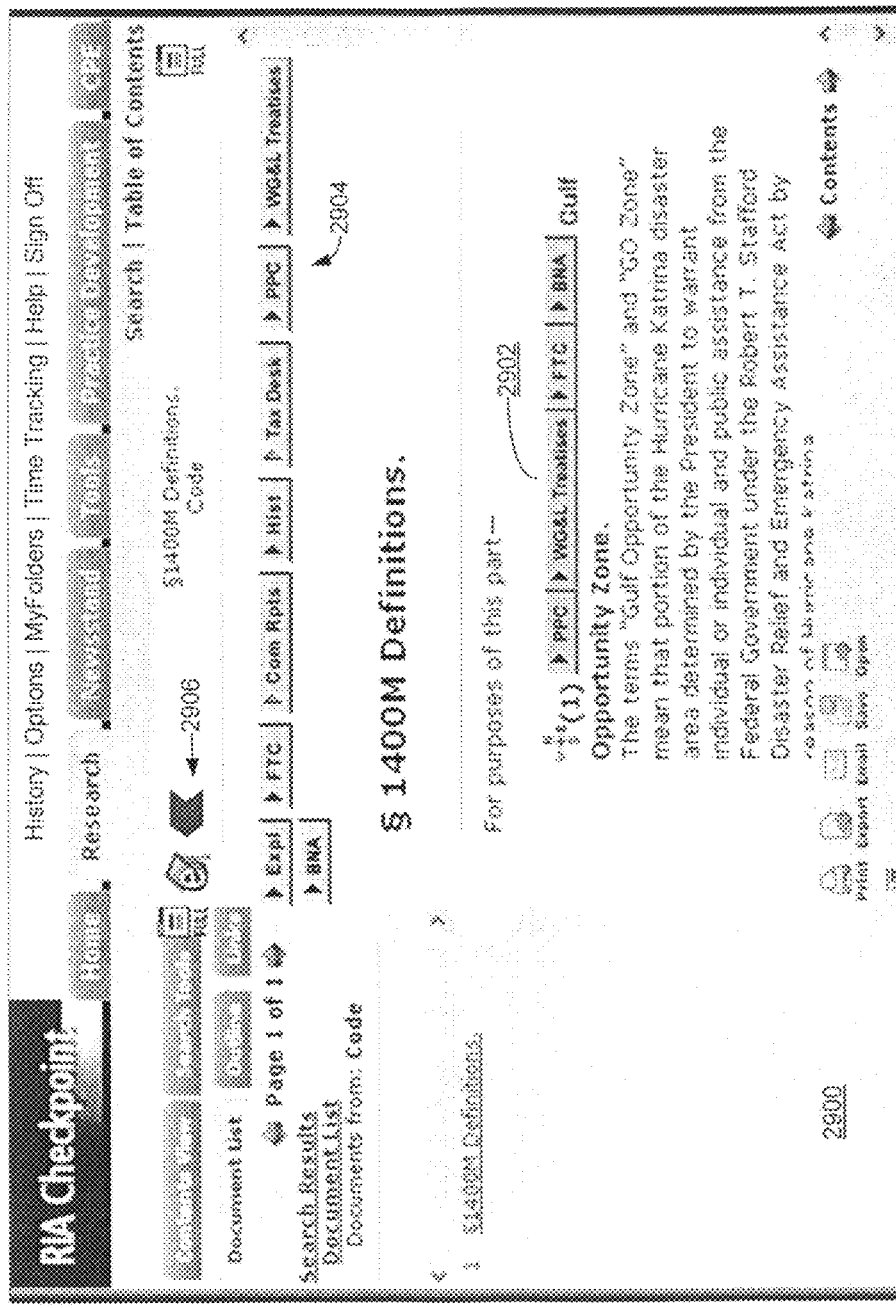
FIG. 29 depicts a user interface representing a resource page associated with the link of FIG. 28.

Clicking on a resource link, such as link 2802 or a link in an online self-study course, connects the user to the professional resource service system, which presents the user with the screen 2900 of FIG. 29. As can be seen, the screen 2900 presents the user with information concerning the subject, Sec. 1400M, linked from the course material and is generated by the professional resource service system as a research page. This direct, seamless transition may be accomplished by the use of SSO or other suitable techniques. Screen 2900 includes a series of links 2902 that may be used by the user to connect to other resources and services for additional information and research concerning this topic. Links or buttons 2904 may be used to directly connect with the other resource service providers. As can be seen from this screen, the professional resource system includes a CPE tab to present the user with an education focused web-page, such as the personalized portal discussed hereinabove. An education icon 2906 is provided to enable the user to return to the CPE course materials page of the education services system. If the link, such as link 2802, leads the user to a service or resource not under contract with the user's firm or company, then the system may automatically offer the user the option of purchasing the service or resource, give guidance as to how to acquire the materials, or give guidance as to who to contact within the organization to inquire into obtaining the materials or service.

Figure 30:
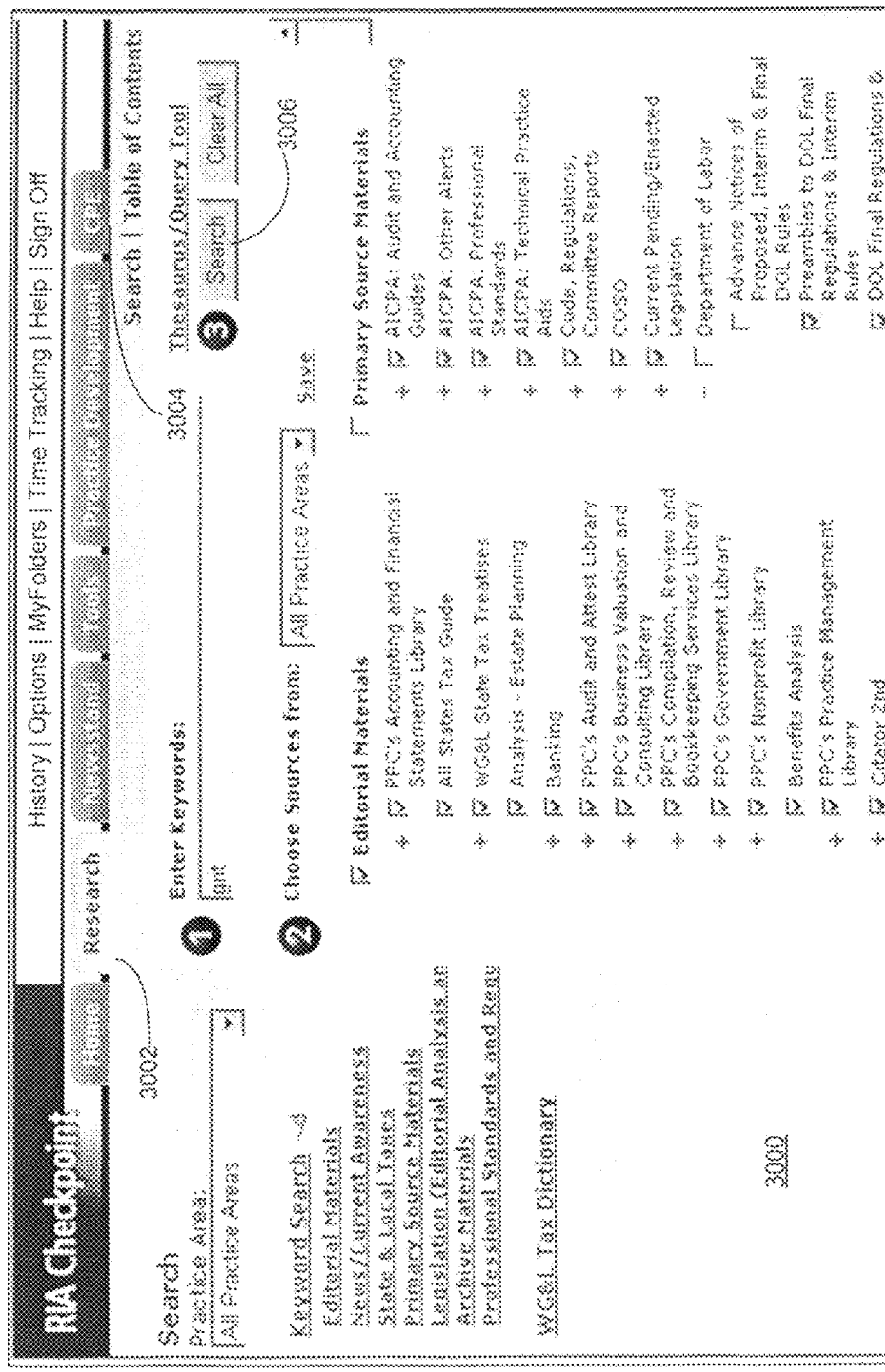
FIG. 30 depicts a research user interface associated with a professional resource system for generating document that have embedded education-related links in conjunction with the present invention.
Figure 31:
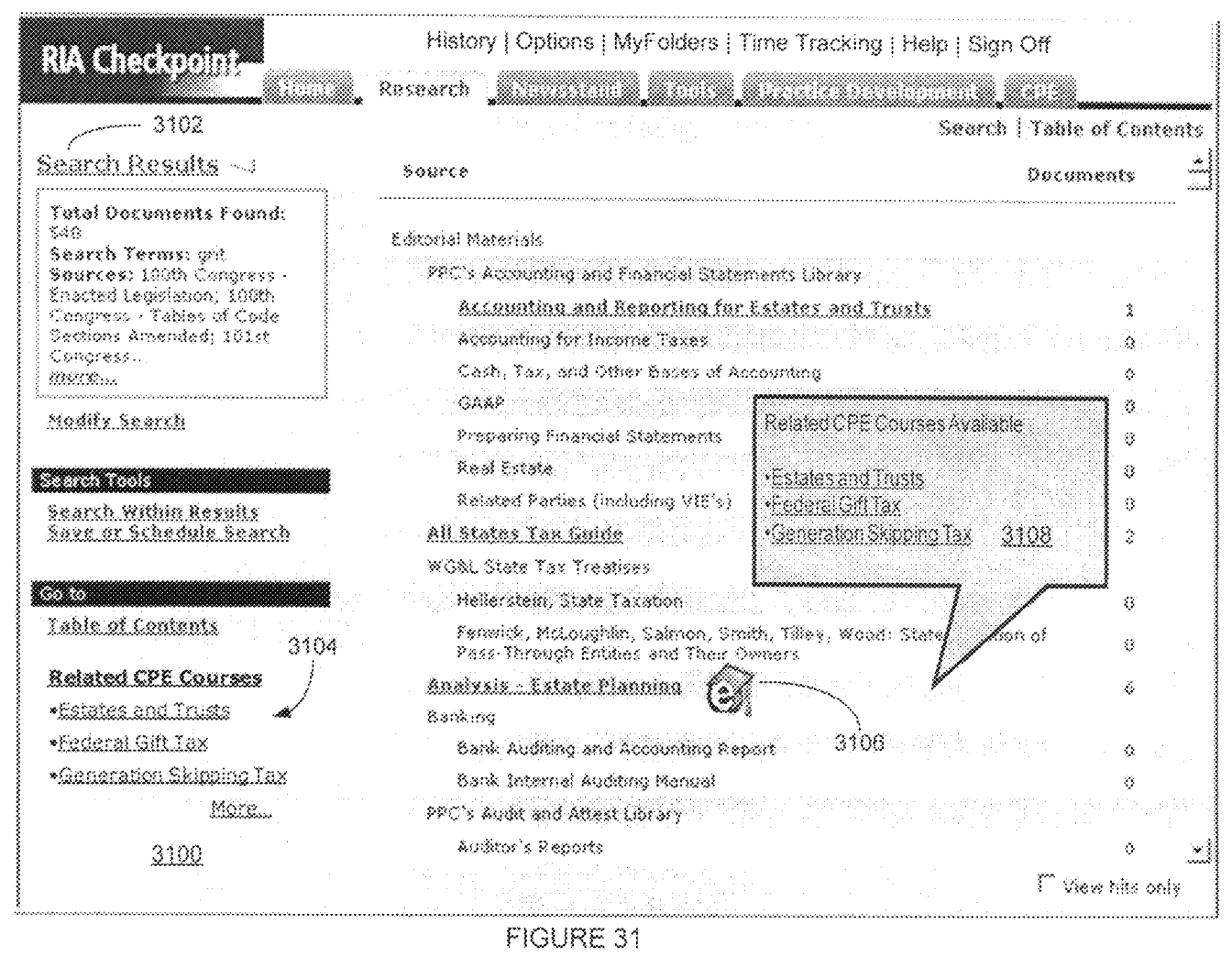
Figure 32:
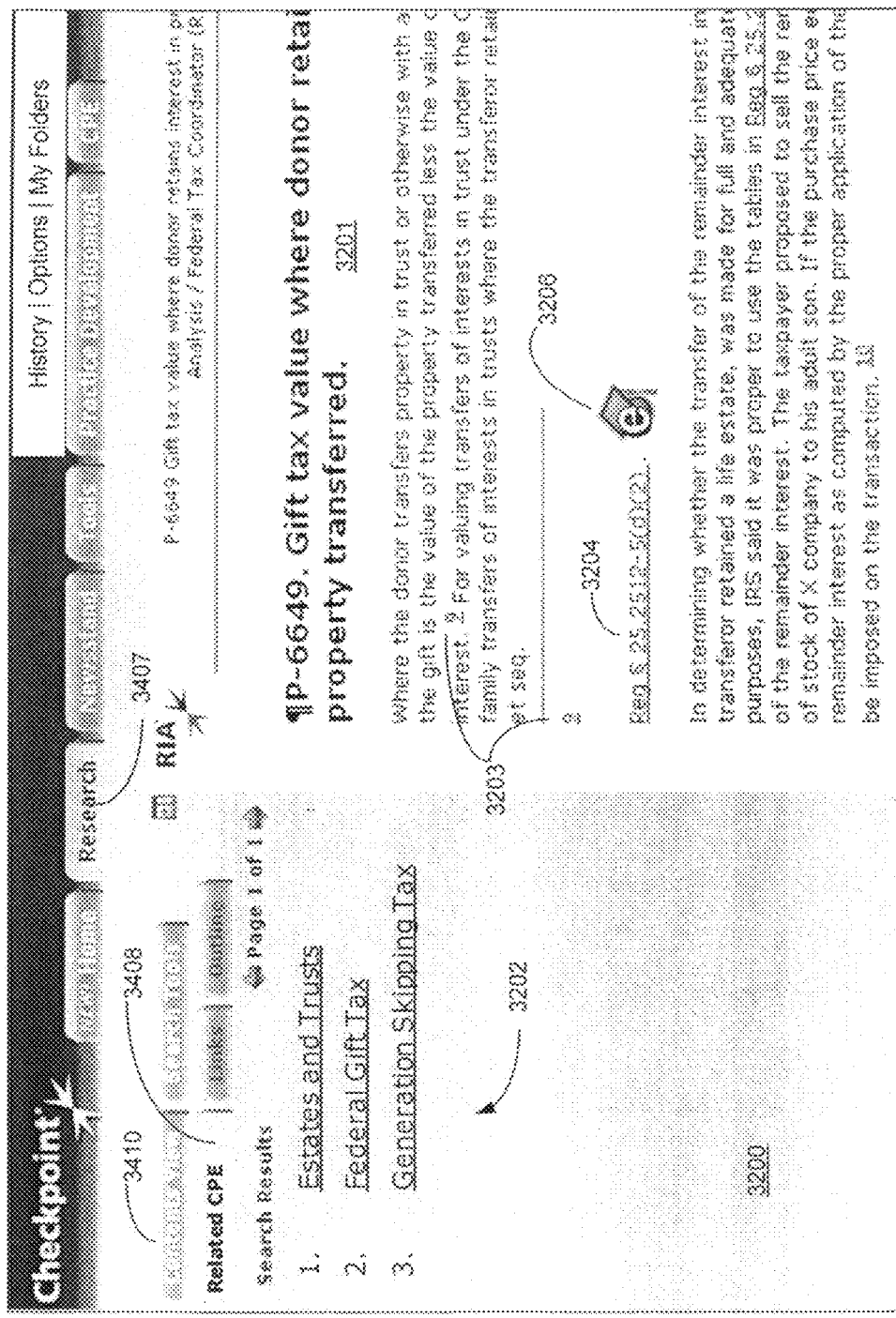
FIG. 32 depicts a research user interface including a document from the search results of FIG. 31 with education-related links.

FIGS. 30-32 illustrate the interfacing and integration of the education services system with the professional resource system to provide "contextual" CPE services, what is in essence immediate CPE and training contextualized to address current research problem. In addition to accessing professional research resources from within the education services system as described above, a user can likewise enter the education services system from a professional resource system. This relates more directly to the system shown in FIG. 2 and described in the associated description above. FIG. 30 illustrates a search page and the process for conducting a search using the Research function 3002 of a professional resource system, e.g., RIA CHECKPOINT. From this search page a user can 1) enter a search term, such as "grit" (Grantor Retained Income Trust) for example, 2) select from among sources available to the user for searching based on practice area and selecting/deselecting from a list of editorial materials and primary source materials, and 3) click on the "search" button 3006 to launch the search. FIG. 31 depicts a screenshot 3100 that illustrates the results 3102 of the search of FIG. 30. In this example, CPE related content is indicated by the graduation cap icon 3106. Rolling the cursor over the icon can reveal a list 3108 of related CPE courses that are available for reviewing by the user conducting the search for consideration of registering for a CPE course related to a subject that the individual is researching. In this manner the integrated professional resource and learning system can facilitate context-based CPE. In addition to or in the alternative to the list 3108, the list 3104 may be presented to the user on the screen 3100. Clicking on the list may reveal a course listing or description and this may be accomplished by opening into a new window. The user may then navigate to the education services system to further investigate the CPE options related to these subjects. In addition to the search screens, FIG. 32 depicts a screen 3200 that displays a research document 3201 from the search results. A footnote 9 3203 in the text of the document 3201 is related to a citation 3204 and a link to that citation 3204 is provided. In addition, an education icon 3206 is provided that indicates to the user that learning/CPE content or courses related to the citation and related text are available to the user. Under the "Research" tab 3207 is included on the left hand panel a "Related CPE" tab 3408 that includes links 3202 to related CPE or learning courses and/or content. The user may click on one of the set of links 3202 under the "Related CPE" tab 3408 to display course related information. The course related document, either for a particular course or set of courses related by topic, may be displayed in the form of a separate window generated by an education services system.

Whether migrating from the education services system to the professional resource services system or vice-versa, the relationships between education (CPE courses and training content) and practice resources (practice guides, research documents) are maintained by database structures and therefore updating content on either side to reflect changes in regulations, legislation, standards, etc., are automatically achieved. This structure enhances the system's ability to be flexible and responsive to changes affecting professional practice.

Discussed herein has been the use of database structures to provide in essence cross-coupling of data and linking across tables and fields in one or more databases. Using SQL for managing data and for schema creation and modification, a relational database management system (RDBMS), for example MySQL®, runs on a server and provides multi-user access to one or more databases for searching, accessing, and processing data and records and may be used in web-based applications. MySQL runs on a wide variety of system platforms including LINUX®, UNIX®, Microsoft WINDOWS® and VISTA®, SYMBIAN®, OS/2®, and others. GUI administration tools such as MySQL Administrator, MySQL GUI Tools, phpMyAdministrator and other tools provide administration of MySQL systems. These tools support a wide range of operations with MySQL. Commonly used operations that are supported by the user interface include managing databases, tables, fields, relations, indexes, users, permissions, and many others.

A primary key (PK) is used to uniquely identify each row in a table and may be made up of multiple fields, i.e., a composite key of more than one column for uniqueness and to enhance speed of query processing. Storage engines, including InnoDB, may be selected based on table requirements and allow functions such as transactions and foreign keys (FK), which may reference primary keys (PK). FKs are used as a referential constraint between two or more tables by identifying a column or a set of columns in one or more "referencing" or "child" table(s) that refer to a column or set of columns in a "referenced" or "master" tables so as to establish a "one" (master) to "many" (children) relationship. In this manner FKs link information across tables, can establish cascading relationships between tables, and provides DB normalization. Other techniques may be used in establishing a DB structure to implement the invention including alternate keys, candidate keys, unique keys, compound keys and superkeys.

In accordance with the present invention, course mapping onto resource and content and other learning services databases may be accomplished using a spreadsheet, such as using Microsoft Excel. In the example of Table 1, below, permalinks, such as URLs, that link to courses having associated Course ID numbers, are associated with chapters or particular sections of professional resource related content, such as practice guidance materials. The links are then embedded in the content and/or table of contents associated with the reference materials and may also be associated with and presented using user interface web pages presented when displaying the content. As shown and described in the various examples, users may click on the permalinks to access the learning related content directly from the professional resource material or webpage.

The permalink is the point of origin for the documents in the professional services resource system, such as CHECKPOINT, and in essence allows access to the URL of a specific document. In one manner, the first step in associating permalinks with URLs and documents involves searching and identifying objectives, key words or phrases from the summary or content of materials of each course. The results of this search provide a reference for determining association with the reference materials. The second step is to perform a search of the table of contents of the reference material, for example, using key words or phrases found in the first step. The third step is to associate, such as using the Excel spreadsheet, the course ID and permalink associated with the course with the table of contents. Upon uploading the Excel spreadsheet in the professional resources system database, the course ID and permalink are then associated with the table of contents. In this manner, when the professional resources system displays the table of contents, such as under a "Research" tab related to the resource materials after a search performed by a professional conducting research on a related subject, the user interface of the professional resources system will also display an icon or list or other indicia indicating that learning course or content related to the document/subject is available.

Using the example of FIG. 32, a table of contents for research related document 3201 may be displayed upon selecting the "Contents View" tab 3410. This view will generally be reflective of the "Chapter" listing of the associated Excel spreadsheet uploaded, e.g.,. Table 1, and include links reflective of the permalinks assigned to the sections of the document that make up the table of contents. This may be in the form of icons located close to the respective parts of the table of contents and/or on a left-hand panel similar to the set of links 3202. Upon a user selecting a displayed course link, the system may either direct the user interface to a new screen representing the course selected or may open a new, separate window related to the selected course for further action by the user, e.g., registering for the course, paying for the course, reviewing table of contents of materials related to course, reviewing subjects covered by the course, and other information such as form of delivery, source of course, instructor, course description, location, etc. FIG. 33 illustrates an exemplary course offering screen 3300 that could be displayed following a selection of a link as described above.

TABLE 1

| Course ID | Permalink | Chapter - resource content |
|---|---|---|
| CLQABA | https://dev.checkpoint.thomsonreuters.com/app/toc?begParm=y&appVer=8.7&permaId=e2b631e2e5ef5a78141317802d368007&permaType=toc&endParm=y | ii. Chapter A-7000 Alternative Minimum Tax |
| CLGAI9 | https://dev.checkpoint.thomsonreuters.com/app/toc?begParm=y&appVer=8.7&permaId=013b556086655bf61db2b6a856b59a79&permaType=toc&endParm=y | xvi. Chapter I Sales and Exchanges, Capital Gains and Losses, Cost Recovery Recapture, Depreciation Recapture |
| CLQABA | https://dev.checkpoint.thomsonreuters.com/app/toc?begParm=y&appVer=8.7&permaId=c03e10e80801359e7c555aa15719e1c1&permaType=toc&endParm=y | Alternative Minimum Tax §§55-59 |
| CLGAI9 | https://dev.checkpoint.thomsonreuters.com/app/toc?begParm=y&appVer=8.7&permaId=a86fb9bac534258f1c85662c2e58d874&permaType=toc&endParm=y | Capital Gains and Losses §§1201-1298 |

The system also provides a way to display a plurality of courses related to a reference document or a section of the table of contents related to the document or a general set of "Related CPE" courses that relate to a subject matter or field. For instance, upon a user selecting a link to related CPE courses, the system may, as shown in the screen shot of FIG. 34, display a set of CPE courses related to the document or subject for consideration by the user. The set of courses shown in the example screen shot of FIG. 34 includes four courses numbered 1-4. The information provided to the user includes the source of the course, e.g., RIA, QUICKFINDER, PPC, the delivery forma of the course, e.g., print based self study, the number of hours of CPE credits, the price, the field of study, the title of the course, and links to additional information and materials. In addition, the learning interface also provides links to additional training solutions, brands, resources, etc. The learning interface also provides a search function to enable the user to search for additional learning options using keywords.

Figure 34:
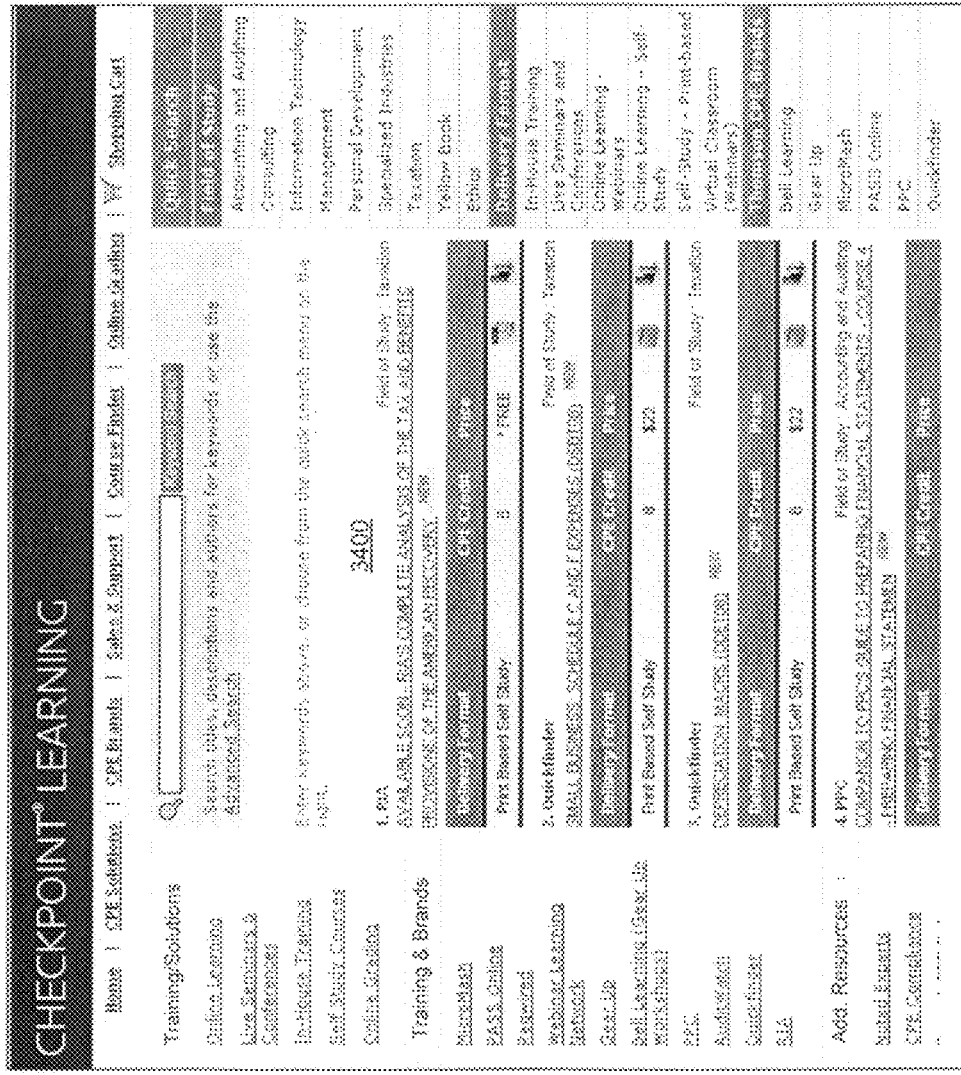
FIG. 34 depicts an alternative exemplary course offering screen displayed following a selection of a link from the user interface screen of FIG. 32.

In the examples of FIGS. 33 and 34, the professional resource service, e.g., CHECKPOINT, that generated the research search results displayed in FIG. 30-32, directed the user to a related or co-branded professional learning system, e.g., CHECKPOINT Learning, to present learning content to the user. This is an example of the operation of the Professional Resource System 202, with Reference and Guidance Component 216 and Professional Learning component 224 as described above in reference to FIG. 2.

In addition to the use of permalinks and manual tagging of content with course related links or vice-versa, the professional resource service may utilize tagging or autotagging techniques to add links and citations to courses or course materials in research reference content. Auto-tagging allows the system to automatically create links for all citations recognized by the professional resource service tagging feature. A variation of this is to use an identified auto-tagging in which specific citations are selected and marked within the course content to be recognized by the system tagging feature.

One aspect of the professional learning system is the ability to create content or to modify existing content for use as course or learning materials. For example, the professional learning system may utilize an interactive courseware editorial tool, e.g., MICROMASH Editor that allows creation and modification of interactive (online) courses in an XML (XMetaL) environment. An interactive course is one delivered electronically and that includes technology that allows the student to interact with the learning environment. The system may be used to set up special users with a particular set of roles that include access to documents and tools to permit creation and editing and inclusion of linking information into database structures to facilitate the displaying of course related links in research reference documents and related searches. For instance, the system may establish certain users as "editors" for creating and editing "tagged" documents. The system may be used to create a citation text link, i.e., a link that uses the CPE course text, which is already part of the course content, as the link to a reference document, e.g., a document resulting from a search conducted using CHECKPOINT. The system may be used to create a non-citation text link, i.e., a link which is not part of the course content text but which is added text that is independent of the course content. It can appear between two paragraphs, at the end of a chapter or even near a header. The primary purpose of a non-citation link is to associate the course with a reference, e.g., a document retrieved and displayed during a search initiated in CHECKPOINT such as PPC Guides, Primary Source Materials, etc.

As discussed above, the Professional Resource and Learning System includes a rules management, reporting and filing capability. The system preferably includes a communication link to a jurisdiction, such as state accounting boards, to update rules associated with professional practice and accreditation in the respective jurisdictions. This would include the number of hours of CPE credits required annually and in other set periods as well as ethics and other requirements. This also includes a capability to facilitate approval for credit of CPE courses, such as in-house courses, put on by professional firms or accounts. Users of the system preferably include in their profile unique identifiers, such as board numbers, that have been assigned to the user by each jurisdiction, such as a state board of accountancy, in which they have been registered or granted licensure. The system uses database structures to automatically associate records of individual professionals with: completion of courses; states and other jurisdictions requiring credits; historical requirements completion; goals; etc. The system uses established and available protocols to communicate CPE related data to and from the various jurisdictions. In addition, techniques such as web scraping, web harvesting, and other data extraction methods, may be used to acquire data related to CPE compliance.

Figure 35:
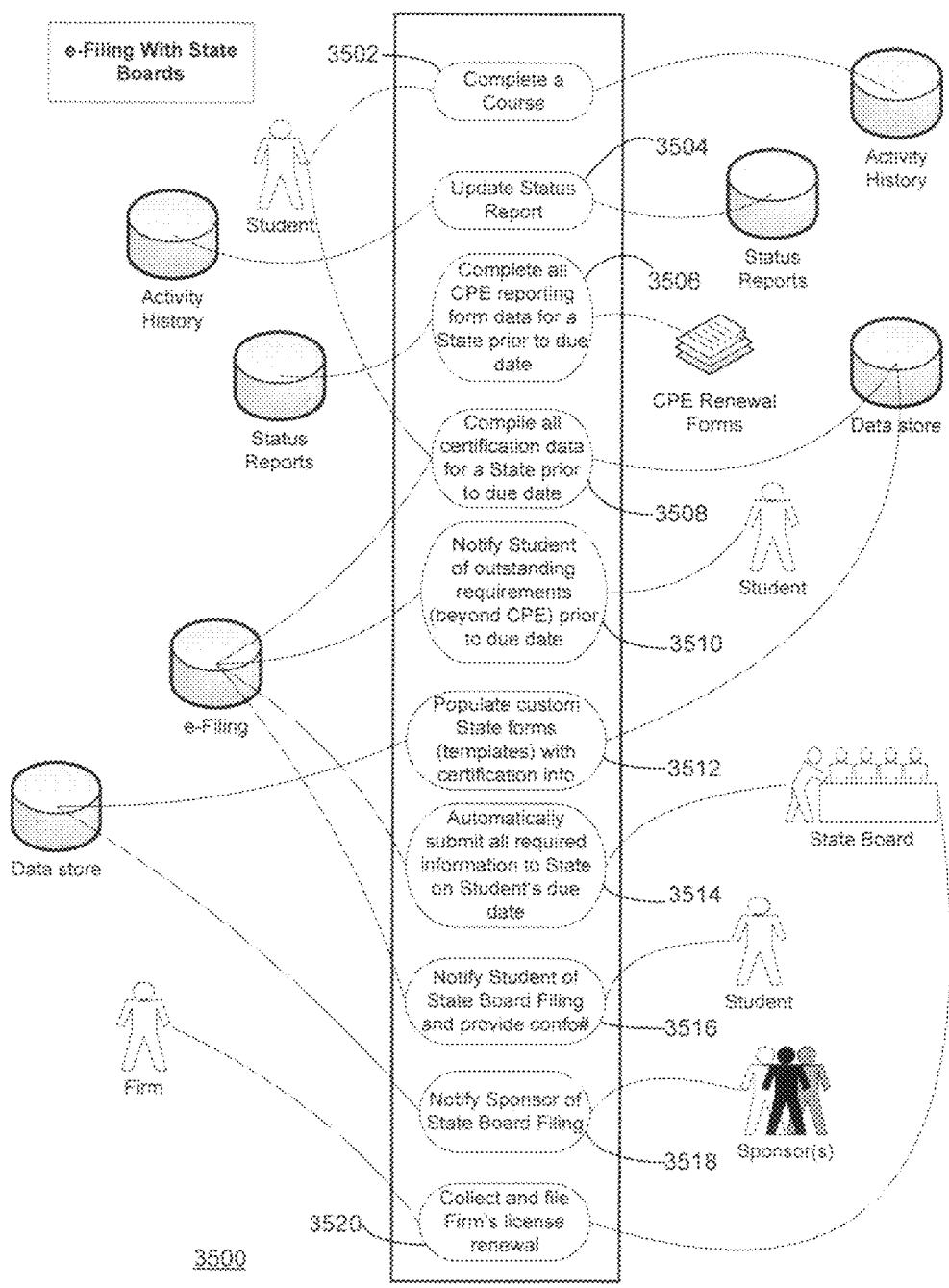
FIG. 35 is a flowchart illustrating an e-filing process associated with the integrated professional services learning system of the present invention.

FIG. 35 is a flowchart illustrating one exemplary embodiment of an automated or semi-automated CPE e-filing process for reporting completion of CPE courses to state boards in which the individual having completed the course(s) is licensed. At step 3502, a student, such as a professional and CHECKPOINT Learning subscriber, completes a CPE course for which CPE credit is given by one or more state boards, i.e., governing entity of the professional's certification(s). A database has one or more tables, columns, fields or records that are updated to reflect the event of the student completing the CPE course. In this instance, a particular software module, Activity History, records each professional's training activity and supports tracking of that training against state certifications. In this example, Activity History is used to reflect the completion and/or a change in status, e.g., completion of a course in progress.

At step 3504, the Activity History module may discretely, or automatically based on some pre-defined process, update the database or record to reflect the completed course for action by the Status Report module. The Status Reports module displays, e.g., via an individual's learning portal, the overall status of a professional's completed and outstanding requirements to maintain their state certification(s). At step 3506, the Status Reports module accesses database records and prints the status report data on a template that is acceptable to one or more state boards. Preferably, all CPE reporting or renewal forms are completed prior to the due date for submission of such forms. CPE renewal forms are documentation required of a professional that verify CPE compliance for the purposes of renewing their professional license in each jurisdiction in which they are licensed to practice.

With reference to Steps 3508-3516, an e-Filing module collects, schedules and distributes appropriate state filing for tax and accounting professionals and handles transactions to accomplish these goals. At step 3508, the student in conjunction with the e-Filing module inputs, captures and stores additional certification renewal information, e.g., filing date, social security number or other student ID, license number, exam completion date, and specific state renewal requirements. In the event required information is missing from a student's learning record, the system may contact the student, such as by automatically generated email message, to prompt the student to enter the needed data. At step 3510, the e-Filing component of the system notifies the student of outstanding requirements prior to or by the due date. Using data from the database, at step 3512 the system populates custom state forms (templates) with certification data or information that may include non-standardized reporting requirements that vary from state to state. At step 3514, the e-Filing module automatically submits all required information to the state board(s) on or before the student's requirements due date. At step 3516, the e-Filing module notifies the student, e.g., email generated by system or posting of notice on student's learning homepage or portal as described above, of the state board filing(s) preferably with a confirmation, tracking or some other number related to the reporting of the completion of the course and request for credit. One additional feature of the system is the capability to notify, at step 3518, the student's sponsor(s), for instance a NASBA-regulated entity providing compliant CPE education, of the completion and reporting of the CPE course. An additional higher level step 3520 allows the firm, such as through an assigned administrator, to collect information and file the firm-wide license renewal form(s).

In addition, the system may include a payment component to facilitate payment of licensure, practice or reporting related fees direct to state entities, boards or other organizations. Using a professional firm's enterprise system, the payments may be entered or tracked such as on a general ledger, which in turn may associate with the payment a tax related indicia, such as that the payment relates to a business deduction. Also, the system, e.g., as part of an in-house course creation process, may establish a communication link with one or more state boards to, for example, submit information related to a CPE course for purposes of obtaining approval for the course from the state board. This may be done on an individual basis or on course-by-course basis. Also, the system may request and obtain state board requirements related information which may then be stored in a database for use in determining individual professional action items.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-implemented method comprising:
   initiating at a client computing device a professional services research session and presenting in response to a query received from the client computing device professional services research related content retrieved from a source of professional services research related content;
   receiving from the client computing device an input requesting information about desired professional services-related resource content;
   in response to the received input, generating for display at the client computing device a user interface screen comprising professional services-related resource content including simultaneously presenting both a set of search results related to professional services research and a set of CPE links enabling a user to access CPE course information concerning a CPE course directly from the professional services related user interface screen, the CPE course having been identified from a set of CPE course sources from a source of CPE content, and including at least some content related to the professional services-related resource content presented via the user interface screen, the CPE course associated with the CPE link being related to at least a subset of the set of search results;
   receiving by a computer a request to register for a CPE course after engaging one link from the set of CPE links, the request being in the form of an electronic signal;

associating with a database record a set of information relating to a jurisdiction in which CPE credit is associated with the CPE course;
subsequent to receiving the request, providing the CPE course;
identifying when the CPE course has been successfully completed; and
upon completion of the CPE course, storing at a database a set of data related to completion of the CPE course and associating the completion with an electronic data record associated with an individual, and electronically notifying the jurisdiction of the completion to facilitate an award of CPE credit to the individual.

2. The method of claim 1 further comprising:
identifying by a computer a set of accounting reference data relevant to the CPE course; and
during at least a portion of the time the CPE course is being provided, providing a link to at least a subset of the set of accounting reference data.

3. The method of claim 1 further comprising:
receiving an electronic signal representing an indicator that the jurisdiction has granted the set of CPE credit;
storing the indicator in the database; and
providing access to the indicator.

4. The method of claim 3 further comprising:
determining a set of gaps between the set of CPE credit granted and a required set of CPE credit for the jurisdiction; and
sending a signal indicative of the set of gaps.

5. The method of claim 1 further comprising:
generating by a computer a message related to one or more of: a CPE requirement associated with an individual; a CPE reporting deadline associated with an individual; a training workflow task related to the CPE course; a training workflow task related to one or more available CPE course; a pre-defined training event associated with an individual for completion; and a workflow component associated with a training workflow program.

6. The method of claim 5 further comprising:
including in the message a link related to one or both of a CPE course and materials related to the CPE course.

7. The method of claim 1 further comprising:
electronically registering for a CPE course by an individual; and
automatically inserting an entry related to the date of the CPE course in one or both of the individual's calendar and dashboard.

8. The method of claim 1 further comprising:
automatically storing in a database a reference to a completed CPE course in a record associated with an individual.

9. The method of claim 1 further comprising:
automatically updating in a database a record to reflect registrations associated with the CPE course; and
generating a message for delivery to an instructor of the CPE course, the message comprising data related to the CPE course registrations.

10. The method of claim 1 further comprising:
automatically generating a message for delivery to attendees of the CPE course, the message comprising data related to the CPE course.

11. The method of claim 1 further comprising:
upon receiving the request, generating a message comprising an offer associated with the CPE course.

12. The method of claim 1 further comprising:
upon receiving the request, generating a message comprising contact information associated with establishing an authorization to attend the CPE course.

13. The method of claim 1 further comprising:
upon receiving the request, generating a message comprising information related to one or more of the following: the CPE course; professional resources related to the CPE course; products and services related to the CPE course that are not included in an existing subscription; and products and services related to the CPE course that are included in an existing subscription.

14. The method of claim 1 further comprising:
prior to receiving the request, electronically displaying a set of CPE course offerings based at least in part on a user profile related to a record stored in a database.

15. The method of claim 14 wherein the user profile comprises data related to one or more of: CPE credit history; CPE credit requirements; CPE credit reporting deadlines; CPE course completion history; professional practice area; preferred CPE course delivery medium; professional development indicia; work engagement history; work position; professional credentials; professional development assignments; geographic indicia; supervisory input; and jurisdictional indicia.

16. The method of claim 1 further comprising:
prior to receiving the request, electronically displaying a set of CPE course offerings based at least in part on an existing subscription to a professional resource service.

17. The method of claim 16 further comprising:
electronically displaying a first set of CPE course offerings covered by the existing subscription and a second set of CPE course offerings not covered by the existing subscription.

18. The method of claim 17 further comprising:
receiving a request for authorization to register for a CPE course selected from the second set of CPE course offerings.

19. The method of claim 1 further comprising:
upon completion of the CPE course receiving a set of data related to a rating assigned to one or both of the CPE course and the CPE course instructor; and
storing the set of rating data in a database.

20. The method of claim 1 further comprising:
receiving an input representing CPE credit awarded by the jurisdiction in response to the notifying step;
storing a set of data representing the CPE credit awarded by the jurisdiction in the database; and
associating the set of CPE credit data with a record associated with the individual taking and completing the CPE course.

21. The method of claim 20 further comprising:
storing a plurality of CPE credit data sets awarded by one or more jurisdictions in the database;
associating, respectively, the plurality of CPE credit data sets with a plurality of individuals identified as receiving the awarded CPE credit; and
generating a report based at least in part on the plurality of CPE credit data sets.

22. The method of claim 21 further comprising:
comparing the plurality of CPE credit data sets with criteria associated with predefined professional development targets.

23. The method of claim 20 further comprising:
aggregating over time CPE credit awards associated with an individual to result in an aggregate CPE credit awarded to the individual; and comparing the aggregate CPE credit with a threshold CPE credit requirement associated with a particular jurisdiction to determine a CPE compliance status.

24. The method of claim 23 further comprising:
upon the aggregate CPE credit being no less than the threshold CPE requirement, generating a message comprising information related to an individual meeting the threshold CPE requirement.

25. The method of claim 23 further comprising:
comparing the aggregate CPE credit with a plurality of CPE credit requirements, each of the plurality of CPE credit requirements respectively associated with a plurality of jurisdictions.

26. The method of claim 23 further comprising:
based at least in part on the CPE compliance status associating a fee with the request.

27. The method of claim 23 further comprising:
providing CPE compliance status information related to a set of individuals to a user assigned a CPE administrator function.

28. The method of claim 1 further comprising:
providing an individualized user interface for presenting via a display, the user interface comprising fields associated with professional development information.

29. The method of claim 28, wherein the fields include one or more of the group consisting of: CPE course offering; CPE course materials; CPE course schedule information; CPE course credit data; CPE compliance status data; CPE jurisdiction threshold data; CPE requirements data; CPE course progress data; professional services reference resource material link; professional services reference resource provider link; CPE course provider link; CPE course search function; CPE reporting function; report generation function; training program data; training goal data; and subject matter graphic representation.

30. The method of claim 28 wherein the individualized user interface is a personalized learning portal consisting of one of a user home-page, a web-portal, a dashboard, and a start-page.

31. The method of claim 1 further comprising:
providing access to multiple Internet-based, CPE course-related services configured to accept single-sign-on (SSO) login.

32. The method of claim 1 further comprising:
providing an electronic CPE course document comprising an embedded link to a professional reference resource related to CPE course content.

33. The method of claim 32 further comprising:
in response to activation of the embedded link, automatically accessing and presenting via a display the professional reference resource.

34. The method of claim 33, wherein the professional reference resource is accessed via an Internet-based professional services resource provider over a communication network.

35. The method of claim 34 further comprising:
providing a return link for display in conjunction with the professional reference resource; and
upon activation of the return link automatically presenting via a display the electronic CPE course document.

36. The method of claim 1 further comprising:
receiving by a computer a set of data related to registration for the CPE course; and
providing a user interface screen to facilitate payment for the CPE course.

37. The method of claim 1 further comprising:
upon activation of the CPE link generating for display a second user interface screen presenting information concerning the CPE course, including information related to registering for the CPE course.

38. The method of claim 1, wherein the CPE link is activated during the provision of research related services.

39. The method of claim 1, further comprising, upon activation of the CPE link, generating a separate window to display the CPE course information.

40. The method of claim 39, wherein the user interface screen is generated by a first computer-based system and the separate window is generated by a second computer-based system.

41. A computer-based system for providing CPE course-related services and content over a network, the system comprising:
a central server, code executable by the central server and stored in a memory associated with the central server, a database, a CPE content database, and a plurality of individual user accounts, the system further comprising:
code executable by a central server for initiating at a client computing device a professional services research session and presenting in response to a query received from the client computing device professional services research related content retrieved from the database;
code executable by a central server for receiving from the client computing device an input requesting information about desired professional services-related resource content;
code executable by a central server to, in response to the received input, generate for display at the client computing device a user interface screen comprising professional services-related resource content including simultaneously presenting both a set of search results related to professional services research and a set of CPE links enabling a user to access CPE course information concerning a CPE course directly from the professional services related user interface screen, the CPE course having been identified from a set of CPE course sources from the CPE content database, and including at least some content related to the professional services-related resource content presented via the user interface screen, the CPE course associated with the CPE link being related to at least a subset of the set of search results;
code executable by a central server to generate a user interface screen for remote display, the user interface screen adapted to present CPE course information and to facilitate receiving by the central server a request to register for a CPE course after engaging one link from the set of CPE links, the request being in the form of an electronic signal and associated with an individual user account;
a record stored in the database and comprising a set of information relating to a jurisdiction in which CPE credit is associated with the CPE course;
code executable by the central server to facilitate registration for and delivery of the CPE course;
code executable by the central server to facilitate confirmation of the completion of the CPE course; and
code executable by the central server to store at a database a set of data related to completion of the CPE course, associating the set of data with the individual user account and electronically notifying the jurisdiction to facilitate an award of CPE credit for an individual associated with the individual user account.

42. The system of claim 41 further comprising:
code executable by the central server to identify a set of accounting reference data relevant to the CPE course and, during at least a portion of the time the CPE course is being provided, provide a link to at least a subset of the set of accounting reference data.

43. The system of claim 41, wherein the central server receives an electronic signal representing an indicator that the jurisdiction has granted the set of CPE credit, and stores the indicator in the database.

44. The system of claim 43 further comprising:
code executable by the central server to determine a set of gaps between the set of CPE credit granted and a required set of CPE credit for the jurisdiction and to send a signal indicative of the set of gaps.

45. The system of claim 41 further comprising:
code executable by the central server to generate a message related to one or more of: a CPE requirement associated with an individual; a CPE reporting deadline associated with an individual; a training workflow task related to the CPE course; a training workflow task related to one or more available CPE course; a predefined training event associated with an individual for completion; and a workflow component associated with a training workflow program.

46. The system of claim 45, wherein the message comprises a link related to one or both of a CPE course and materials related to the CPE course.

47. The system of claim 41 further comprising:
code executable by the central server to electronically register an individual for a CPE course, and automatically insert an entry related to the date of the CPE course in one or both of the individual's calendar and dashboard.

48. The system of claim 41 further comprising:
code executable by the central server to automatically store in a database a reference to a completed CPE course in a record associated with an individual user account.

49. The system of claim 41 further comprising:
code executable by the central server to automatically update in a database a record to reflect registrations associated with the CPE course, and generate a message for delivery to an instructor of the CPE course, the message comprising data related to the CPE course registrations.

50. The system of claim 41 further comprising:
code executable by the central server to automatically generate a message for delivery to attendees of the CPE course, the message comprising data related to the CPE course.

51. The system of claim 41 further comprising:
code executable by the central server to, upon receiving the request, determine a status associated with the individual user account and generate a message comprising an offer associated with the CPE course.

52. The system of claim 41, wherein upon receiving the request the central server generates for remote display a message comprising information related to one or more of the following: the CPE course; professional resources related to the CPE course; products and services related to the CPE course that are not included in an existing subscription; and products and services related to the CPE course that are included in an existing subscription.

53. The system of claim 41, wherein prior to receiving the request the central server generates for remote display a user interface screen comprising a set of CPE course offerings based at least in part on a profile related to the individual user account stored in a database.

54. The system of claim 53, wherein the profile comprises data related to one or more of: CPE credit history; CPE credit requirements; CPE credit reporting deadlines; CPE course completion history; professional practice area; preferred CPE course delivery medium; professional development indicia; work engagement history; work position; professional credentials; professional development assignments; geographic indicia; supervisory input; and jurisdictional indicia.

55. The system of claim 41 further comprising:
code executable by the central server to, prior to receiving the request, generate a user interface screen for remote display comprising a set of CPE course offerings based at least in part on an existing subscription to a professional resource service.

56. The system of claim 55 further comprising:
code executable by the central server to, prior to receiving the request, generate a user interface screen for remote display comprising a first set of CPE course offerings covered by the existing subscription and a second set of CPE course offerings not covered by the existing subscription.

57. The system of claim 56, wherein the central server receives via the user interface screen a request for authorization to register for a CPE course selected from the second set of CPE course offerings.

58. The system of claim 41 further comprising:
code executable by the central server to generate a user interface screen for remote display comprising rating input fields whereby upon completion of the CPE course the central server receives a set of data related to a rating assigned to one or both of the CPE course and the CPE course instructor and stores the set of rating data in a database.

59. The system of claim 41 further comprising:
code executable by the central server to receive an input representing CPE credit awarded by a jurisdiction and associate the set of CPE credit data with a record associated with an individual user account, the central server storing a set of data representing the CPE credit awarded by the jurisdiction in the database.

60. The system of claim 59, wherein the central server receives and stores a plurality of CPE credit data sets awarded by one or more jurisdictions in the database and associates, respectively, the plurality of CPE credit data sets with a plurality of individual user accounts associated with individuals identified as receiving the awarded CPE credit, the system further comprising:
code executable by the central server to generate a report based at least in part on the plurality of CPE credit data sets.

61. The system of claim 60 further comprising:
code executable by the central server to compare the plurality of CPE credit data sets with criteria associated with predefined professional development targets.

62. The system of claim 59 further comprising:
code executable by the central server to aggregate over time CPE credit awards associated with an individual user account to result in an aggregate CPE credit, and to compare the aggregate CPE credit with a threshold CPE credit requirement associated with a particular jurisdiction to determine a CPE compliance status.

63. The system of claim 62, wherein upon the aggregate CPE credit being no less than the threshold CPE requirement, the central server generates for remote display a message comprising information related to an individual meeting the threshold CPE requirement.

64. The system of claim 62 further comprising:
code executable by the central server to compare the aggregate CPE credit with a plurality of CPE credit requirements, each of the plurality of CPE credit requirements respectively associated with a plurality of jurisdictions.

65. The system of claim 62 further comprising:
code executable by the central server to generate a for remote display at a computer associated with a user account assigned a CPE administrator function a message comprising CPE compliance status information related to a set of individual user accounts.

66. The system of claim 41 further comprising:
code executable by the central server to generate an individualized user interface for presenting via a remote display, the user interface comprising fields associated with professional development information.

67. The system of claim 66, wherein the fields include one or more of the group consisting of: CPE course offering; CPE course materials; CPE course schedule information; CPE course credit data; CPE compliance status data; CPE jurisdiction threshold data; CPE requirements data; CPE course progress data; professional services reference resource material link; professional services reference resource provider link; CPE course provider link; CPE course search function; CPE reporting function; report generation function; training program data; training goal data; and subject matter graphic representation.

68. The system of claim 66 wherein the individualized user interface comprises a personalized learning portal consisting of one of a user home-page, a web-portal, a dashboard, and a start-page.

69. The system of claim 41 further comprising:
code executable by the central server to providing access to multiple Internet-based, CPE course-related services configured to accept single-sign-on (SSO) login.

70. The system of claim 41 further comprising:
code executable by the central server to generate for remote display an electronic CPE course document comprising an embedded link to a professional reference resource related to CPE course content.

71. The system of claim 70 further comprising:
code executable by the central server to, in response to activation of the embedded link, automatically access and present via a remote display the professional reference resource.

72. The system of claim 71, wherein the professional reference resource is accessed via an Internet-based professional services resource provider over a communication network.

73. The system of claim 41 further comprising:
code executable by the central server to receive via a user interface screen a set of data related to registration for the CPE course, and provide a user interface payment screen to facilitate payment for the CPE course.

74. The system of claim 41, wherein upon activation of the CPE link the central server generates for remote display a second user interface screen comprising information concerning the CPE course, including information related to registering for the CPE course.

75. The system of claim 74, wherein the central server receives a command activating the CPE link during the provision of research related services.

76. The system of claim 74 further comprising code executable by the central server to, upon activation of the CPE link, generate a separate window to display CPE course information.

77. The system of claim 76, wherein the user interface screen is generated by a first computer-based system and the separate window is generated by a second computer-based system.

78. In a computer-based system for providing CPE course-related services and content over a network, the system comprising:
a central server, code executable by the central server and stored in a memory associated with the central server, a database and a plurality of individual user accounts, a computer-readable medium having embodied therein a computer program for execution on a computer having an associated memory, the computer readable medium comprising:
a graphical user interface adapted to present for remote display user interface screens associated with CPE course-related services;
code executable by a central server for initiating at a client computing device a professional services research session and presenting in response to a query received from the client computing device professional services research related content retrieved from the database;
code executable by a central server for receiving from the client computing device an input requesting information about desired professional services-related resource content;
code executable by a central server to, in response to the received input, generate at the client computing device a user interface screen comprising professional services-related resource content including simultaneously presenting both a set of search results related to professional services research and a CPE link enabling a user to access CPE course information concerning a CPE course directly from the professional services related user interface screen, the CPE course having been identified from a set of CPE course sources in a CPE content database, and including at least some content related to the professional services-related resource content presented via the user interface screen, the CPE course associated with the CPE link being related to at least a subset of the set of search results;
code executable by a central server to generate a user interface screen for remote display, the user interface screen adapted to present CPE course information and to facilitate receiving by the central server a request to register for a CPE course, the request being in the form of an electronic signal and associated with an individual user account, the central server adapted to access for processing a record stored in a database, the record comprising a set of information relating to a jurisdiction in which CPE credit is associated with the CPE course;
code executable by the central server to facilitate registration for and delivery of the CPE course;
code executable by the central server to facilitate confirmation of the completion of the CPE course;
code executable by the central server to store at the database a set of data related to completion of the CPE course and to associate the set of data with the individual user account; and code executable by the central server to electronically notify the jurisdiction to facilitate an award of CPE credit for an individual associated with the individual user account.

79. The computer readable medium of claim 78 further comprising:
code executable by the central server to identify a set of accounting reference data relevant to the CPE course and, during at least a portion of the time the CPE course is being provided, provide a link to at least a subset of the set of accounting reference data.

80. The computer readable medium of claim 78, wherein the central server receives an electronic signal representing an indicator that the jurisdiction has granted the set of CPE credit, and stores the indicator in the database.

81. The computer readable medium of claim 80 further comprising:
code executable by the central server to determine a set of gaps between the set of CPE credit granted and a required set of CPE credit for the jurisdiction and to send a signal indicative of the set of gaps.

82. The computer readable medium of claim 78 further comprising:
code executable by the central server to receive an input representing CPE credit awarded by a jurisdiction and to associate the set of CPE credit data with a record associated with an individual user account, the central server storing a set of data representing the CPE credit awarded by the jurisdiction in the database.

83. The computer readable medium of claim 82, wherein the central server receives and stores a plurality of CPE credit data sets awarded by one or more jurisdictions in the database and associates, respectively, the plurality of CPE credit data sets with a plurality of individual user accounts associated with individuals identified as receiving the awarded CPE credit, the computer readable medium further comprising:
code executable by the central server to generate a report based at least in part on the plurality of CPE credit data sets.

84. The computer readable medium of claim 82 further comprising:
code executable by the central server to aggregate over time CPE credit awards associated with an individual user account to result in an aggregate CPE credit, and to compare the aggregate CPE credit with a threshold CPE credit requirement associated with a particular jurisdiction to determine a CPE compliance status.

85. The computer readable medium of claim 84 further comprising:
code executable by the central server to compare the aggregate CPE credit with a plurality of CPE credit requirements, each of the plurality of CPE credit requirements respectively associated with a plurality of jurisdictions.

86. The computer readable medium of claim 78 further comprising:
code executable by the central server to providing access to multiple Internet-based, CPE course-related services configured to accept single-sign-on (SSO) login.

87. A computer-based system for providing professional resource and learning services over a network, the system comprising:
a first server executing code for initiating at a client computing device a professional services research session and presenting in response to a query received from the client computing device professional services research related content from a professional services research related content database;
the first server executing code adapted to receive from the client computing device an input requesting information about desired professional services-related resource content;
the first server executing code adapted to, in response to the received input, generate at a client computing device for remote display a first user interface screen comprising professional resource-related content including simultaneously presenting both a set of search results related to a professional services research and a link enabling a user to access CPE course information related to a CPE course directly from the professional services related user interface screen, the CPE course having been identified from a set of CPE course sources from a CPE content database, and including a set of content related to the professional resource-related content presented via the first user interface screen, the CPE course associated with the CPE link being related to at least a subset of the set of search results;
a second server executing code adapted to generate for remote display a second user interface screen comprising information related to the CPE course;
the second server adapted to receive over a communications link an electronic signal representing a request to register for the CPE course, and further adapted to associate with a database record a set of information relating to a jurisdiction in which CPE credit is associated with the CPE course;
the second server adapted to identify when the CPE course has been successfully completed and to store at a database a set of data related to completion of the CPE course, including data associating the completion with an electronic data record associated with an individual; and
the second server adapted to establish a communication link to electronically notify the jurisdiction of the completion to facilitate an award of CPE credit to the individual.

\* \* \* \* \*